US010333376B2

(12) United States Patent
Yang et al.

(10) Patent No.: US 10,333,376 B2
(45) Date of Patent: Jun. 25, 2019

(54) DOUBLE-ROTOR SWITCHED RELUCTANCE MACHINE

(71) Applicant: McMaster University, Hamilton (CA)

(72) Inventors: Yinye Yang, Hamilton (CA); Ali Emadi, Burlington (CA)

(73) Assignee: McMaster University, Hamilton (CA)

( * ) Notice: Subject to any disclaimer, the term of this patent is extended or adjusted under 35 U.S.C. 154(b) by 389 days.

(21) Appl. No.: 14/061,812

(22) Filed: Oct. 24, 2013

(65) Prior Publication Data

US 2014/0111038 A1 Apr. 24, 2014

Related U.S. Application Data

(60) Provisional application No. 61/717,808, filed on Oct. 24, 2012.

(51) Int. Cl.
*H02K 16/00* (2006.01)
*H02K 15/02* (2006.01)
*H02K 19/10* (2006.01)

(52) U.S. Cl.
CPC ............ *H02K 16/00* (2013.01); *H02K 15/02* (2013.01); *H02K 19/103* (2013.01); *Y10T 29/49012* (2015.01)

(58) Field of Classification Search
CPC .......... H02K 5/24; H02K 16/00; H02K 16/02; H02K 17/00; H02K 19/20; H02K 21/16; H02K 37/04; H02K 37/06; H02P 25/08; H02P 25/22; D06F 37/304
See application file for complete search history.

(56) References Cited

U.S. PATENT DOCUMENTS

| 6,257,027 | B1* | 7/2001 | Imai | D06F 37/304 |
| | | | | 68/12.12 |
| 6,888,330 | B2* | 5/2005 | Arimitsu | H02K 16/02 |
| | | | | 318/433 |
| 6,998,757 | B2* | 2/2006 | Seguchi | F02N 11/04 |
| | | | | 310/114 |
| 7,026,742 | B2 | 4/2006 | Miyake et al. | |
| 7,259,493 | B2 | 8/2007 | Oshidari et al. | |
| 7,839,048 | B2 | 11/2010 | Jansen et al. | |
| 2007/0205682 | A1* | 9/2007 | Choi | D06F 37/304 |
| | | | | 310/114 |

(Continued)

FOREIGN PATENT DOCUMENTS

JP 07163105 A * 6/1995 ............. H02K 10/02

*Primary Examiner* — Tran N Nguyen
(74) *Attorney, Agent, or Firm* — Bereskin & Parr LLP/S.E.N.C.R.L., s.r.l.; Stephen Beney; T. Cameron Gale

(57) ABSTRACT

Various embodiments are described herein for a double-rotor switched reluctance machine. In one example embodiment, the double-rotor switched reluctance machine comprises an interior rotor, an exterior rotor spaced from the interior rotor and coaxially and concentrically disposed outside the interior rotor, and at least one stator disposed concentrically with the interior rotor and the exterior rotor. The interior rotor, the exterior rotor and the at least one stator are disposed within one machine set to provide an interior switched reluctance machine and an exterior switched reluctance machine. The interior switched reluctance machine and the exterior switched reluctance machine can operate as two motors, two generators, or a motor and a generator simultaneously.

18 Claims, 27 Drawing Sheets

(56) References Cited

U.S. PATENT DOCUMENTS

2008/0142284 A1\* 6/2008 Qu ..................... B60K 17/145
                                              180/65.6
2008/0238236 A1\* 10/2008 El-Refaie ............. H02K 19/103
                                              310/166

\* cited by examiner

DOUBLE-ROTOR SWITCHED RELUCTANCE MACHINE

CROSS-REFERENCE TO RELATED APPLICATION

This application claims the benefit of U.S. Provisional Patent Application No. 61/717,808 filed Oct. 24, 2012, the contents of which are incorporated herein by reference.

TECHNICAL FIELD

The described embodiments relate to a switched reluctance machine, and in particular, to a double-rotor switched reluctance machine.

BACKGROUND

Electric machines have been applied as motors and generators in a wide range of industries for more than a century. A reluctance machine is an electric machine in which torque is produced by the tendency of the movable part of the machine to move into a position where the inductance of an excited winding is maximized. A switched reluctance machine is a type of a reluctance machine where the windings are energized as a function of the position of the movable part of the machine.

Conventional switched reluctance machines typically utilize one stator with windings on the stator teeth to generate electromagnetic field so that one rotor in the electromagnetic field has the tendency to align with the stator to achieve maximum inductance. The rotor rotates as long as the stator excitation switches successfully.

Typically, two conventional switched reluctance machines require two rotors, two stators, two sets of machine housings, two sets of cooling systems, etc. This results in a complex and expensive machine manufacturing.

SUMMARY

In one aspect, at least one embodiment described herein provides a switched reluctance machine comprising: an interior rotor; an exterior rotor spaced from the interior rotor, the interior rotor and the exterior rotor being coaxially and concentrically disposed; and at least one stator disposed concentrically with the interior rotor and the exterior rotor, where the interior rotor, the exterior rotor and the at least one stator are configured to provide an interior switched reluctance machine and an exterior switched reluctance machine.

In some embodiments, at least one stator is located between the exterior rotor and the interior rotor, where the at least one stator has an exterior side and an interior side, and where the exterior side of the stator is salient with exterior stator poles and the interior side is salient with interior stator poles. In such embodiments, the exterior switched reluctance machine comprises the exterior rotor and the exterior side of the stator, and the interior switched reluctance machine comprises the interior side of the stator and the interior rotor.

In some embodiments, the exterior rotor is salient with rotor poles, and the exterior stator poles comprise coil windings for generating a magnetic field. In such embodiments, the exterior rotor rotates to align the rotor poles with the magnetic field providing a motor operation in the exterior switched reluctance machine.

In some embodiments, the interior rotor is salient with rotor poles, and the interior stator poles comprise coil windings for generating a magnetic field. In such embodiments, the interior rotor rotates to align the rotor poles with the magnetic field providing a motor operation in the interior switched reluctance machine.

In some other embodiments, the at least one stator is located outside the exterior rotor, wherein the exterior rotor comprises an exterior side and an interior side, and where the exterior side is salient with exterior poles and the interior side is salient with interior poles. In such embodiments, the exterior switched reluctance machine comprises the at least one stator and the exterior side of the exterior rotor, and the interior switched reluctance machine comprises the interior side of the exterior rotor and the interior rotor.

In some embodiments, the at least one stator is salient with stator poles and the stator poles comprising coil windings to generate a magnetic field. In such embodiments, the exterior rotor rotates to align the exterior poles with the magnetic field providing a motor operation in the exterior switched reluctance machine.

In some embodiments, the interior rotor is salient with rotor poles, and the rotor poles comprise coil windings for generating a magnetic flux. In such embodiments, the magnetic flux aligns the interior poles of the exterior rotor to the rotor poles of the interior rotor and provides a motor operation in the interior switched reluctance machine.

In some further embodiments, the at least one stator is located inside the interior rotor, wherein the interior rotor comprises an exterior side and an interior side, and where the exterior side is salient with exterior poles and the interior side is salient with interior poles. In such embodiments, the exterior switched reluctance machine comprises the exterior rotor and the exterior side of the interior rotor, and the interior switched reluctance machine comprises the interior side of the interior rotor and the at least one stator.

In some embodiments, the exterior rotor is salient with rotor poles, and the rotor poles comprise coil windings to generate a magnetic flux. In such embodiments, the magnetic flux aligns the exterior poles of the interior rotor with the rotor poles of the exterior rotor and provides a motor operation in the exterior switched reluctance machine.

In some embodiments, the at least one stator is salient with stator poles, and the stator poles comprise coil windings to generate a magnetic flux. In such embodiments, the magnetic flux aligns the interior poles of the interior rotor with the stator poles and provides a motor operation in the interior switched reluctance machine.

In some other embodiments, the at least one stator comprises an exterior stator and an interior stator, the exterior stator being spaced from the interior stator, and the exterior stator and the interior stator being concentrically disposed with the interior rotor and the exterior rotor.

In some embodiments, the interior stator is located between the exterior rotor and the interior rotor, and the exterior stator is located outside the exterior rotor, and the inner stator comprises an exterior side and an interior side, where the exterior side is salient with exterior poles and the interior side is salient with interior poles. In such embodiments, the exterior switched reluctance machine comprises the exterior stator, the exterior rotor and the exterior side of the interior stator, and the interior switched reluctance machine comprises the interior side of the interior stator and the interior rotor.

In some embodiments, the exterior stator comprises stator poles on an interior side of the exterior stator, and the stator poles and the exterior poles of the interior stator comprise coil windings for generating a magnetic flux in same direction. In such embodiments, the magnetic flux aligns the exterior rotor with the stator poles and the exterior poles of the interior stator for providing a motor operation in the exterior switched reluctance machine.

In some embodiments, the exterior stator comprises stator poles on an exterior side of the stator to integrate with another switched reluctance machine concentrically disposed with the exterior stator.

In some embodiments, the interior rotor comprises rotor poles on an exterior side of the interior rotor, and the interior poles of the interior stator comprise coil windings for generating a magnetic flux. In such embodiments, the magnetic flux aligns the rotor poles with the interior poles and provides a motor operation in the interior switched reluctance machine.

In some embodiments, the interior rotor comprises rotor poles on an interior side of the interior rotor to integrate with another switched reluctance machine concentrically disposed with the interior rotor.

In some embodiments, the exterior rotor and the interior rotor are configured to rotate simultaneously.

In some embodiments, the at least one stator comprises a plurality of stator columns, where the plurality of stator columns are separated from each other and mechanically coupled to each other.

In some embodiments, the exterior rotor comprises a plurality of rotor columns, where the plurality of rotor columns are separated from each other and mechanically coupled to each other.

In some embodiments, the exterior rotor comprises a plurality of rotor columns and the at least one stator comprises a plurality of stator columns.

In such embodiments, the plurality of rotor columns are separated and mechanically coupled to each other, and the plurality of stator columns are separated and mechanically coupled to each other.

In some embodiments, the exterior rotor comprises a plurality of rotor shells. In such embodiments, the rotor shells are separated from each other and the rotor shells are mechanically coupled to each other.

In some embodiments, the exterior rotor and the interior rotor are displaced at different positions along an axial direction.

In some embodiments, the exterior rotor and the at least one stator are displaced at different positions along an axial direction.

In some embodiments, the switched reluctance machine comprises an insulation layer between the exterior switched reluctance machine and the interior switched reluctance machine to separate magnetic flux paths between the exterior switched reluctance machine and the interior switched reluctance machine.

In another aspect, in at least one embodiment described herein, there is provided a method of manufacturing a switched reluctance machine, the method comprising: providing an interior rotor; disposing an exterior rotor spaced from the interior rotor, the exterior rotor being coaxially and concentrically disposed; and disposing at least one stator concentrically with the interior rotor and the exterior rotor, where the interior rotor, the exterior rotor and the at least one stator being configured to provide an interior switched reluctance machine and an exterior switched reluctance machine.

In some embodiments, the method comprises disposing the at least one stator between the exterior rotor and the interior rotor, where the at least one stator has an exterior side and an interior side and providing exterior stator poles to the exterior side of the at least one stator and interior stator poles to the interior side of the at least one stator, where the exterior switched reluctance machine comprises the exterior rotor and the exterior side of the stator, and the interior switched reluctance machine comprises the interior side of the stator and the interior rotor.

In some embodiments, the method further comprises providing rotor poles to the exterior rotor; providing coil windings to the exterior stator poles, the coil windings configurable to generate a magnetic field; and aligning the exterior rotor to the magnetic field in the coil windings of the exterior stator poles to provide a motor operation in the exterior switched reluctance machine.

In some other embodiments, the method further comprises providing rotor poles to the interior rotor; providing coil windings to the interior stator poles, the coil windings configurable to generate a magnetic field; and aligning the interior rotor to the magnetic field in the coil windings of the interior stator poles to provide a motor operation in the interior switched reluctance machine.

In some further embodiments, the method comprises disposing the at least one stator outside the exterior rotor; and configuring the exterior rotor to have exterior poles on an exterior side of the exterior rotor and interior poles on an interior side of the exterior rotor, where the exterior switched reluctance machine comprises the at least one stator and the exterior side of the exterior rotor, and the interior switched reluctance machine comprises the interior side of the exterior rotor and the interior rotor.

In some embodiments, the method comprises providing stator poles to the at least one stator; providing coil windings to the stator poles, the coil windings configurable to generate a magnetic field; and aligning the exterior poles of the exterior rotor to the magnetic field in the coil windings of the stator poles to provide a motor operation in the exterior switched reluctance machine.

In some other embodiments, the method comprises providing rotor poles to the interior rotor; providing coil windings to the rotor poles, the coil windings configurable to generate a magnetic flux; and aligning the interior poles of the exterior rotor to the rotor poles of the interior rotor in response to the magnetic flux to provide a motor operation in the interior switched reluctance machine.

In some further embodiments, the method comprises disposing the at least one stator inside the interior rotor; and configuring the interior rotor to have exterior poles on an exterior side of the interior rotor and interior poles on an interior side of the interior rotor, where the exterior switched reluctance machine comprises the exterior rotor and the exterior side of the interior rotor, and the interior switched reluctance machine comprises the interior side of the interior rotor and the at least one stator.

In some embodiments, the method further comprises providing rotor poles to the exterior rotor; providing coil windings to the rotor poles, the coil windings configurable to generate a magnetic flux; and aligning the exterior poles of the interior rotor with the rotor poles of the exterior rotor in response to the magnetic flux to provide a motor operation in the exterior switched reluctance machine.

In some other embodiments, the method further comprises providing stator poles to the at least one stator; providing coil windings to the stator poles, the coil windings configurable to generate a magnetic flux; and aligning the interior poles of the interior rotor with the stator poles in response to the magnetic flux to provide a motor operation in the interior switched reluctance machine.

In some further embodiments, the at least one stator comprises an exterior stator and an interior stator, and the method further comprises disposing the exterior stator spaced from the interior stator, wherein the exterior stator and the interior stator are disposed concentrically with the interior rotor and the exterior rotor.

In some embodiments, the method comprises disposing the interior stator between the exterior rotor and the interior rotor, and the exterior stator outside the exterior rotor; and configuring the inner stator to have exterior poles on an exterior side of the inner stator and interior poles on an interior side of the inner stator, where the exterior switched reluctance machine comprises the exterior stator, the exterior rotor and the exterior side of the interior stator, and the interior switched reluctance machine comprises the interior side of the interior stator and the interior rotor.

In some embodiments, the method comprises providing an interior side of the exterior stator with stator poles; providing coil windings to the stator poles and the exterior poles of the interior stator, the coil windings configurable to generate a magnetic flux in same direction; and aligning the exterior rotor with the stator poles and the exterior poles of the interior stator in response to the magnetic flux to provide a motor operation in the exterior switched reluctance machine.

In some embodiments, the method further comprises providing an exterior side of the stator with stator poles to integrate with another switched reluctance machine concentrically disposed with the exterior stator.

In some other embodiments, the method comprises providing an exterior side of the interior rotor with rotor poles; providing coil windings to the interior poles of the interior stator, the coil windings configurable to generate a magnetic flux; and aligning the rotor poles with the interior poles in response to the magnetic flux to provide a motor operation in the interior switched reluctance machine.

In some embodiments, the method comprises providing an interior side of the interior rotor with rotor poles to integrate with another switched reluctance machine concentrically disposed with the interior rotor.

In some embodiments, the method comprises rotating the exterior rotor and the interior rotor simultaneously.

In some embodiments, the at least one stator comprises a plurality of stator columns, where the plurality of stator columns are separated from each other and the plurality of stator columns are mechanically coupled to each other.

In some embodiments, the exterior rotor comprises a plurality of rotor columns, where the rotor columns is separated from each other and the rotor columns is mechanically coupled to each other.

In some embodiments, the exterior rotor comprises a plurality of rotor columns and the at least one stator comprises a plurality of stator columns, where the plurality of rotor columns are separated and mechanically coupled to each other, and the plurality of stator columns are separated and mechanically coupled to each other.

In some embodiments, the exterior rotor comprises a plurality of rotor shells, where the rotor shells are separated from each other and the rotor shells are mechanically coupled to each other.

In some embodiments, where the exterior rotor and the interior rotor are displaced at different positions along an axial direction.

In some embodiments, where the exterior rotor and the at least one stator are displaced at different positions along an axial direction.

In some embodiments, the method further comprises providing an insulation layer between the exterior switched reluctance machine and the interior switched reluctance machine to separate magnetic flux paths between the exterior switched reluctance machine and the interior switched reluctance machine.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

Several embodiments of the present invention will now be described in detail with reference to the drawings, in which.

Figure 1A:
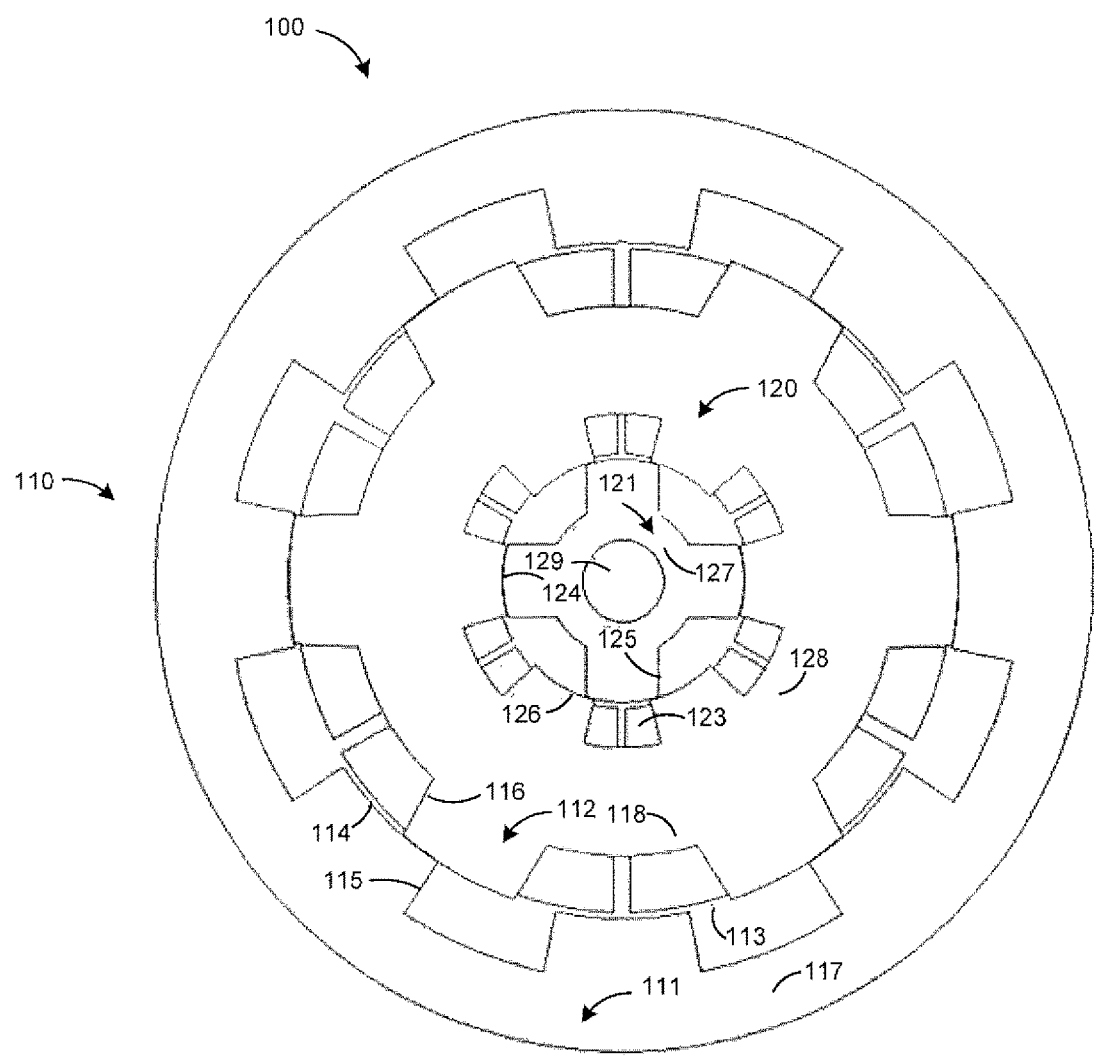
FIG. 1A is a cross-sectional view of a switched reluctance machine in accordance with an example embodiment.

The drawings are provided for the purposes of illustrating various aspects and features of the example embodiments described herein. For simplicity and clarity of illustration, elements shown in the FIGS. have not necessarily been drawn to scale. Further, where considered appropriate, reference numerals may be repeated among the FIGS. to indicate corresponding or analogous elements.

DETAILED DESCRIPTION

The various embodiments described herein relate to a compound switched reluctance machine that comprises at least two rotors and one stator integrated into one machine set. The switched reluctance machine described herein has an advantage of realizing the function of two individual electric machines.

In some cases, the switched reluctance machine described here operates as two individual switched reluctance machines by utilizing the double rotors separately. In some other cases, the switched reluctance machine described here operates as on device by synchronizing the operation of the two rotors. This may have the advantage of enhanced power density.

In some further cases, the switched reluctance machine described here operates as a torque coupler device, such as, for example, mechanical clutches in hybrid powertrain systems. In this configuration, the switched reluctance machine operates by holding and releasing either of the two rotors with the stator through electromagnetic field force or through mechanical clutches, or by synchronizing the two rotors with the same rotating speed, so that the output speed or relative speed of the two rotors can be controlled as clutch engaged or released, respectively.

The switched reluctance machine described here may provide advantages of high power density, compact volume and size, and lower manufacturing costs. In addition, the switched reluctance machine described here provides the advantage of functioning as two independent electric machines, which may be operated as two generators, two motors, or a generator and a motor. In configurations where the switched reluctance machine described here operates as a single switched reluctance machine, the advantage may be a high power density.

The various embodiments described here may have applications in the fields of hybrid electric vehicle powertrain, hybrid electric aircraft powertrain, hybrid ship powertrain, or some other electro-mechanical integrated transmission to serve as the electric prime mover and receiver. The various embodiments described here may further have applications in hybrid electric and plug-in hybrid electric vehicles, such as, for example, cars, SUVs, trucks, motorbikes, etc., to replace the existing or conventional motor and generators in transmissions power train.

The switched reluctance machine described here employs double rotors rotating concentrically with the same stator. The two rotors and the stator may be configured in a variety of ways. This may have the advantage of enhancing the output power performance and realizing higher flexibility. The integration of two rotors and a stator has the advantage of reducing the need for another set of stator, machine housing, cooling system, etc., and thus reduce the overall assembly volume at the same power level.

The switched reluctance machines described here may exist in a variety of configurations. In one configuration, the stator is sandwiched in between the two rotors so that each of the rotors forms a conventional switched reluctance machine with the stator, i.e., the outer rotor and the stator form the outer switched reluctance machine while the interior rotor and the stator form the inner switched reluctance machine.

In another configuration, one of the rotors is in the middle of the stator and the other rotor so that the middle rotor and stator form a conventional switched reluctance machine while the middle rotor and the other rotor together form a "floating-stator" switched reluctance machine. A "floating-stator" means that the "stator" is actually rotatable and the relative motion between the two rotors defines the magnetic field of the second switched reluctance machine.

In some cases, the machine members are installed concentrically in a radial direction. In some other cases, the double rotors and the one stator are installed in a split pattern so that smaller radial diameter can be realized. These and various other configurations are described in the application below.

Both stator-in-the-middle configuration and rotor-in-the-middle configuration may be provided to suit different types of applications. Both coaxially sandwiched configuration and axially split configuration may be provided to meet different space requirement. Misaligned double-rotor configuration and stacked double-rotor switched reluctance machine module may be provided to suit different power density requirements.

Reference is made to FIG. 1A illustrating a switched reluctance machine 100 according to an example embodiment. In particular, FIG. 1 A illustrates a cross-sectional view of the switched reluctance machine 100.

The switched reluctance machine 100 of FIG. 1A consists of an exterior rotor 111, an interior rotor 121, and a stator 112 located in between the exterior rotor 111 and the interior rotor 121. The stator 112 is shared by both the exterior rotor 111 and the interior rotor 121, forming an exterior switched reluctance machine 110 and an interior switched reluctance machine 120, respectively.

The exterior side of the stator 112 is salient with exterior stator poles 116 and the interior side of the stator 112 is salient with interior stator poles 126. This allows the switched reluctance machine 100 to achieve a higher aligned inductance to unaligned inductance ratio so that a higher torque density and a higher power density can be realized.

The exterior switched reluctance machine 110 contains an exterior rotor 111, an exterior side of the stator 112, and exterior coils 113. The exterior rotor 111 is also salient with rotor pole 115. An air gap 114 is formed between the rotor poles 115 and the exterior stator poles 116.

In various embodiments, the exterior stator poles 116 have coil windings 113 to generate magnetic field. In such embodiments, there are no coil windings on the rotor poles 115. The exterior coil windings 113 generate magnetic flux 131 through the exterior stator poles 116. The flux 131 penetrates the air gap 114 between the exterior stator poles 116 and the rotor poles 115 and then goes into the exterior rotor 111. The flux 131 between the exciting or energized exterior stator poles 116 and the corresponding rotor poles 115 tends to align the rotor poles 115 with the exciting exterior stator poles 116 so that the rotor rotates. This provides the motoring operation.

The exciting stator coil windings 113 change phase from one pole to another in sequence according to the rotor position so that the motor keeps rotating. The flux 131 then splits by half into the back iron 117 of the exterior rotor 111 and merges again at the other end of the rotor pole 115. The flux 131 then again goes through the rotor pole 115, the air gap 114, and the exterior stator pole 116 on the other side of the exterior rotor 111. Eventually, the flux 131 splits again in the exterior stator back iron 118 and merges at the base of the exterior stator pole 115 where the flux 131 is generated.

The interior switched reluctance machine 120 contains an interior rotor 121, the interior side of the stator 112, and interior coils 123. The interior rotor 121 is also salient with rotor poles 125. An air gap 124 is formed between the rotor poles 125 and the interior stator poles 126.

In various embodiments, the interior stator poles 126 have interior coil windings 123 to generate magnetic field. In such embodiments, there are no coil windings around the interior rotor poles 125. The interior coil windings 123 generate magnetic flux 132 through the interior stator poles 126. The flux 132 penetrates the air gap 124 between the interior stator poles 126 and the interior rotor poles 125 and then goes into the interior rotor 121. The flux 132 between the exciting stator poles 126 and the corresponding rotor poles 125 tends to align the interior rotor poles 125 with the exciting interior stator poles 126 so that the rotor rotates, thus providing the motoring operation.

The exciting stator coils 123 change phase from one pole to another in sequence according to the rotor position so that the motor keeps rotating. The flux 132 then splits by half into the back iron 127 of the interior rotor 121 around the interior shaft 129 and merges again at the other end of the interior rotor pole 125 of the interior rotor 121. The flux 132 then again goes through the interior rotor pole 125, the interior air gap 124, and the interior stator pole 126 on the other side of the interior rotor 121. Eventually, the flux 132 splits in the interior stator back iron 128 and merges at the base of the interior stator pole 126 where the flux 132 is generated.

The flux paths 131/132 described above for the exterior switched reluctance machine 110 and the interior switched reluctance machine 120, and in the application overall, are for illustration purposes only. In fact, there is neither a starting point nor an ending point of the flux path. The whole flux path 133 is an entire loop formed by the entire exterior switched reluctance machine 110 and the entire interior switched reluctance machine 120. By having the coil windings 113 and 123 only around the exterior stator poles 116 and interior stator poles 126, respectively, the switched reluctance machine 100 have an advantage of construction simplicity.

The switched reluctance machine 100 may function as a motor as described above. In some other cases, the exterior switched reluctance machine 110 and the interior switched reluctance machine 120 may both operate as generators. In some further cases, one of the exterior switched reluctance machine 110 and the interior switched reluctance machine 120 operates as a motor, and the other of the exterior switched reluctance machine 110 and the interior switched reluctance machine 120 operates as a generator.

Reference is made to FIG. 1A, in which the stator 120 is continuous and uninterrupted between the interior side and the exterior side. The exterior rotor 111 and the interior rotor 121 of switched reluctance machine 100 are concentrically aligned so that they share the same rotating axis. The stator 112 is designed so that the flux paths 131/132 described above can merge as a single flux path 133, as illustrated in FIG. 1D, while the exterior switched reluctance machine 110 and the interior switched reluctance machine 120 work independently.

Figure 1B:
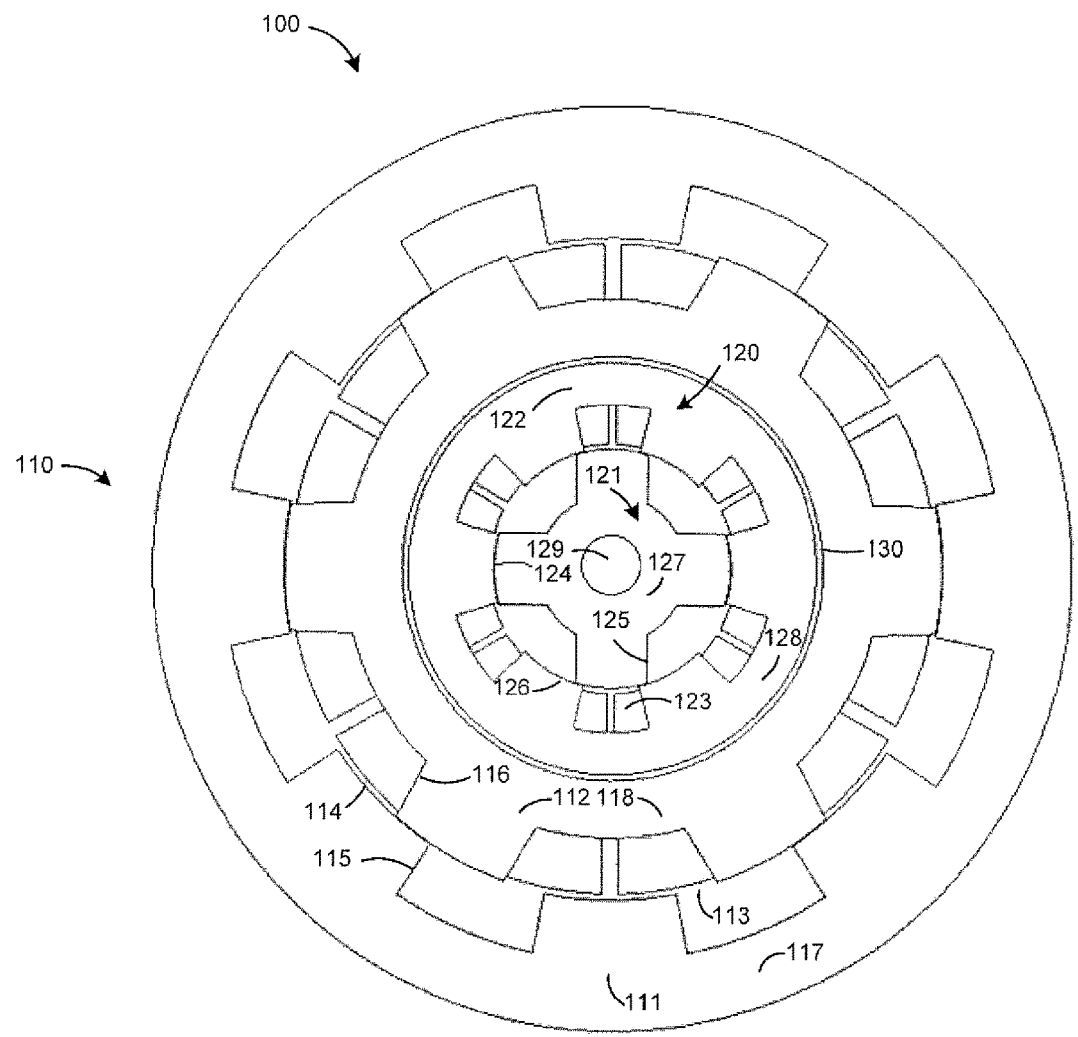
FIG. 1B is the switched reluctance machine of FIG. 1A with insulation in the stator.

Reference is next made to FIG. 1B, illustrating another embodiment of a switched reluctance machine. FIG. 1B illustrates the switched reluctance machine 100 of FIG. 1A with the addition of an insulation layer in the stator 112. In this embodiment, an insulation layer 130 is inserted between the exterior switched reluctance machine 110 and the interior switched reluctance machine 120 to separate the flux paths 131/132 of the two switched reluctance machines, illustrated in FIG. 1E.

Since only stators have coil windings 113 and 123 wound on the interior and exterior stator poles 116 and 126, it is only necessary to route cooling systems through the stators.

Figure 1C:
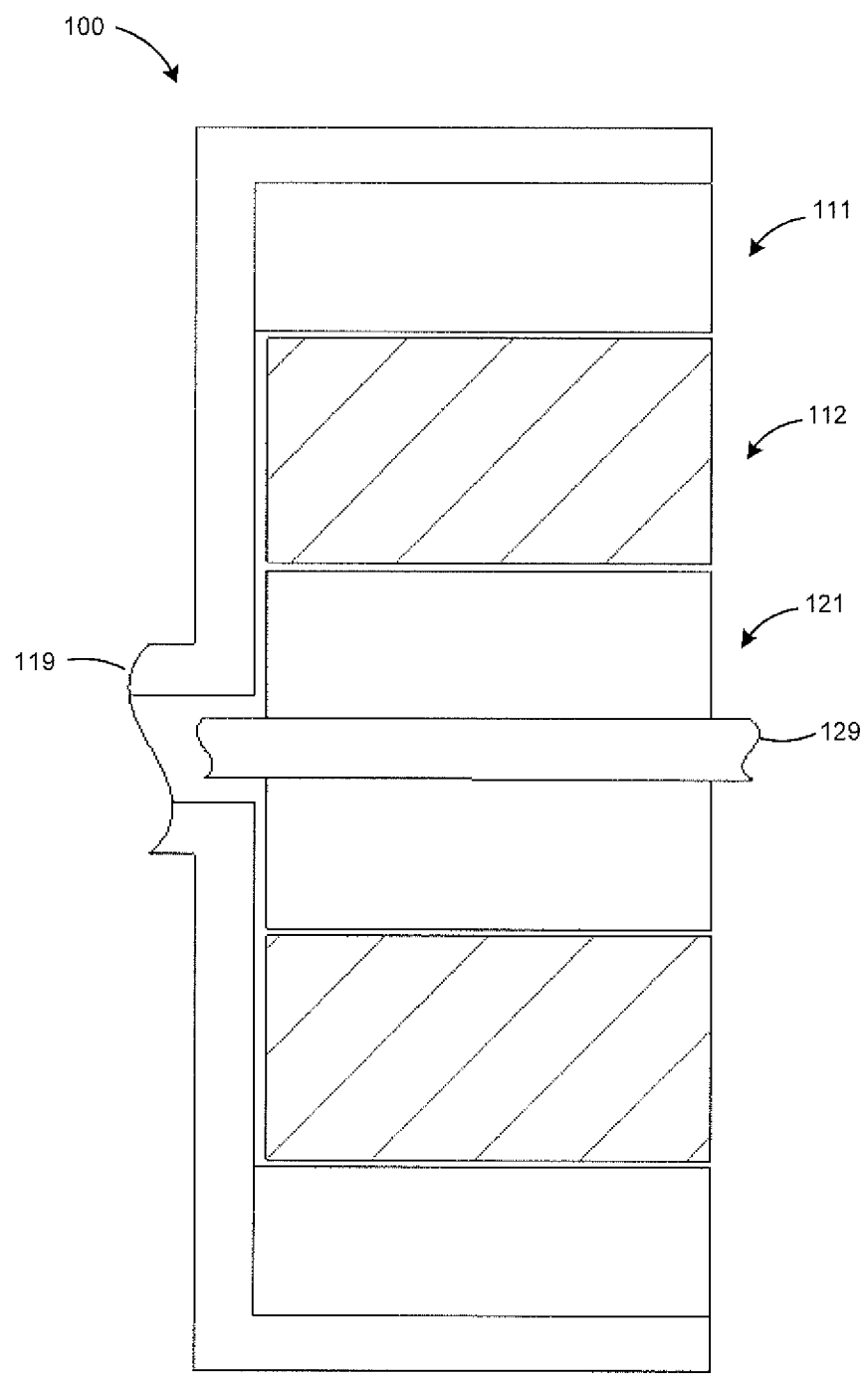
FIG. 1C is a cross-sectional side view of the switched reluctance machine of FIG. 1A.
Figure 1D:
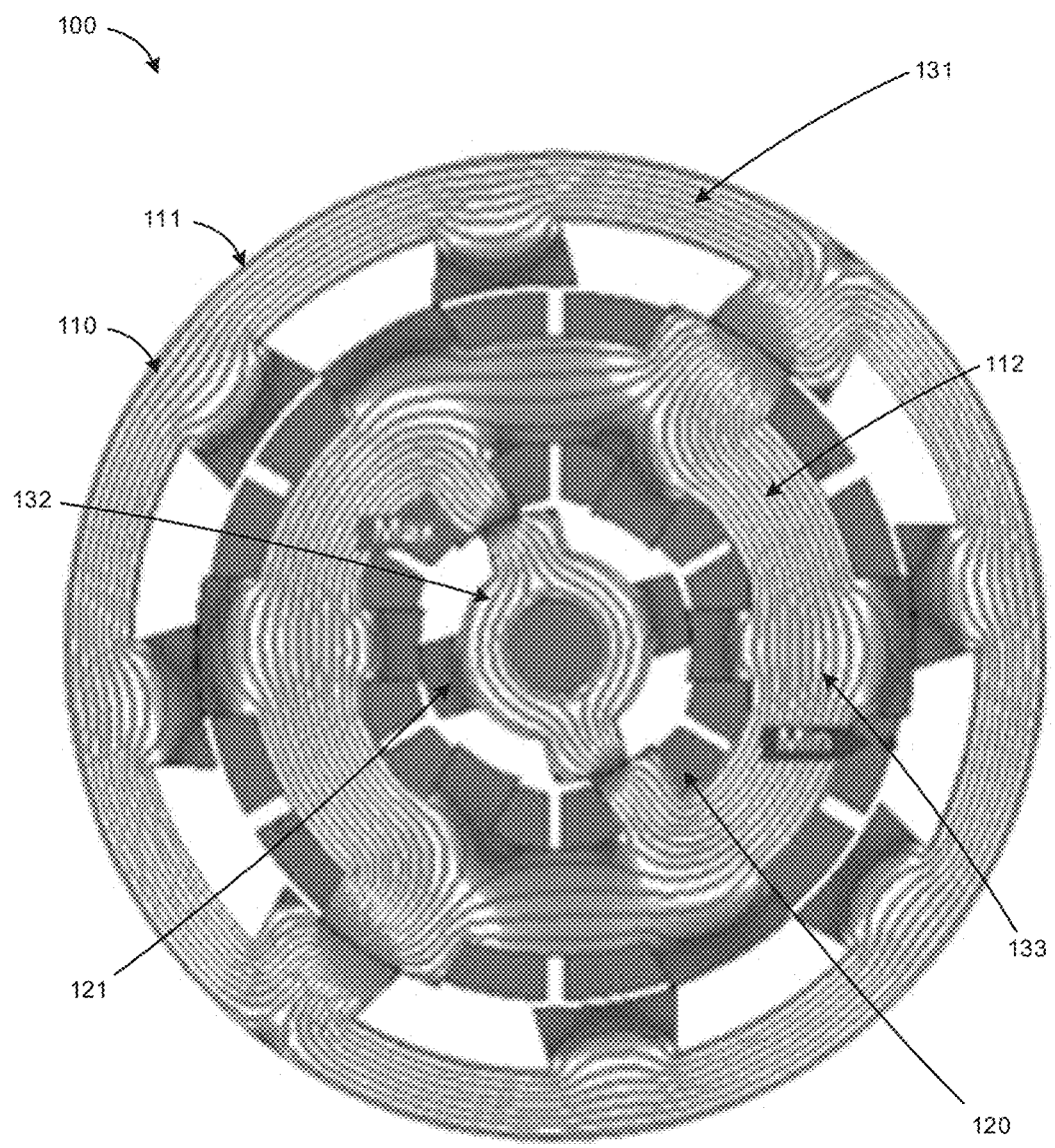
FIG. 1D is the switched reluctance machine of FIG. 1A with the magnetic flux paths shown.
Figure 1E:
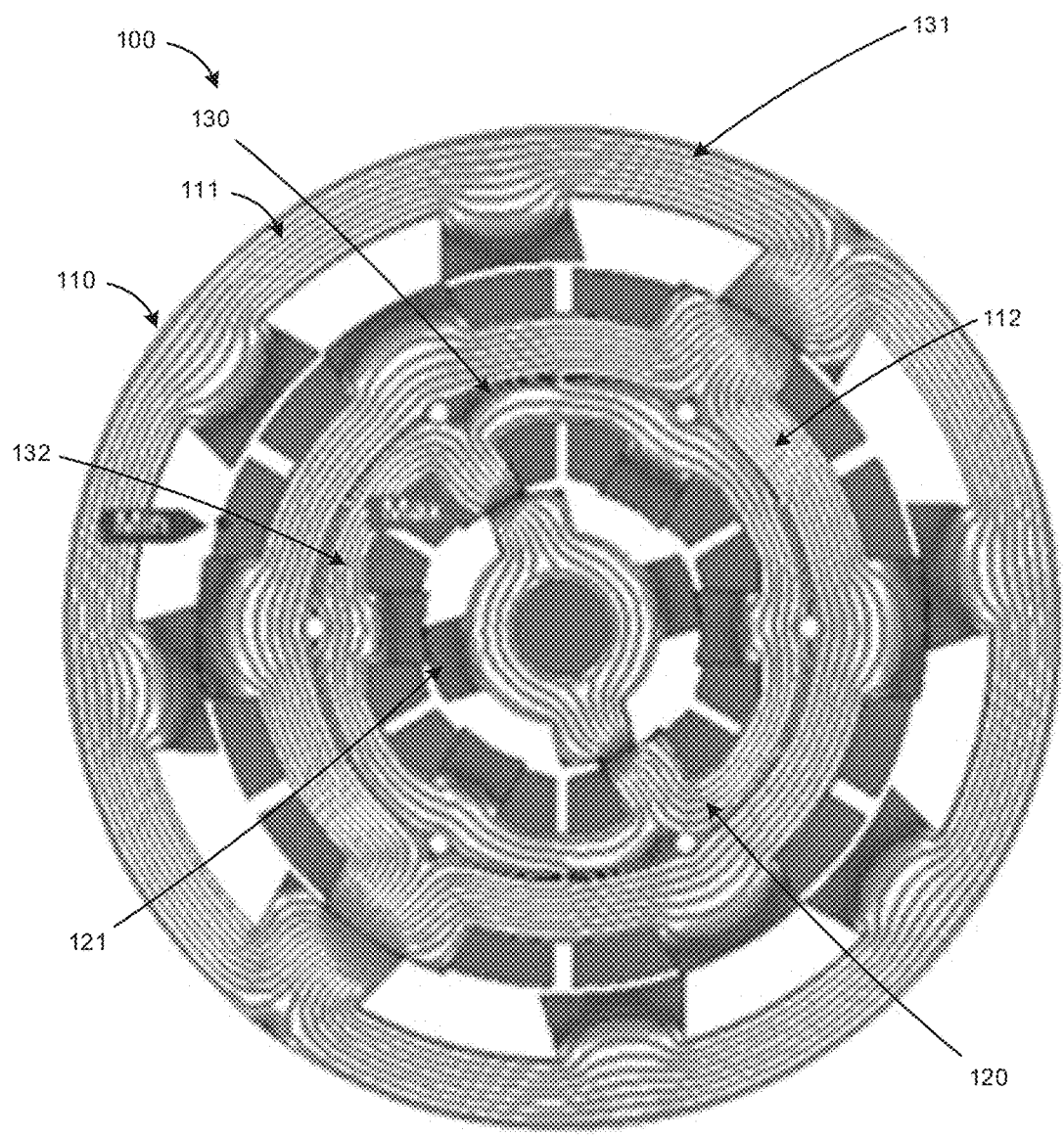
FIG. 1E is the switched reluctance machine of FIG. 1B with the magnetic flux paths shown.

Reference is next made to FIG. 1C, illustrating a cross-sectional side view of the switched reluctance machine 100 of FIG. 1A. The switched reluctance machine 100 provides two output paths: one from the exterior rotor 111, and the other from the interior rotor 121. The exterior rotor 111 connects directly with the exterior shaft 119 and the interior rotor 121 connects directly with the interior shaft 129. In this configuration, both the exterior and the interior rotors 111 and 121, and accordingly both the two output shafts 119 and 129, can be controlled independently by the exterior switched reluctance machine 110 and the interior switched reluctance machine 120, respectively.

As illustrated in FIG. 1C, the exterior output shaft 119 is placed at one direction while the interior output shaft 129 has terminal ends at both directions. This is for illustration purposes only. In some other embodiments, the output shafts 119 and 129 may be placed toward the opposite direction or have different number of terminal ends without affecting the functionality of the switched reluctance machine 100.

The switched reluctance machine 100 may have any number of exterior stator poles 116, exterior rotor poles 115, exterior coils 113, interior stator poles 126, interior rotor poles 125, and interior coil windings 123. Various combinations illustrated in this application as for illustration purposes only. Various embodiments of switched reluctance machine may have any number of stator poles, rotor poles, and coil windings. In some cases, pole pair patterns, such as stator pole to rotor pole ratios of 6/4, 8/6, 6/8, 6/10, 12/8, 8/14 etc., are used.

Figure 2A:
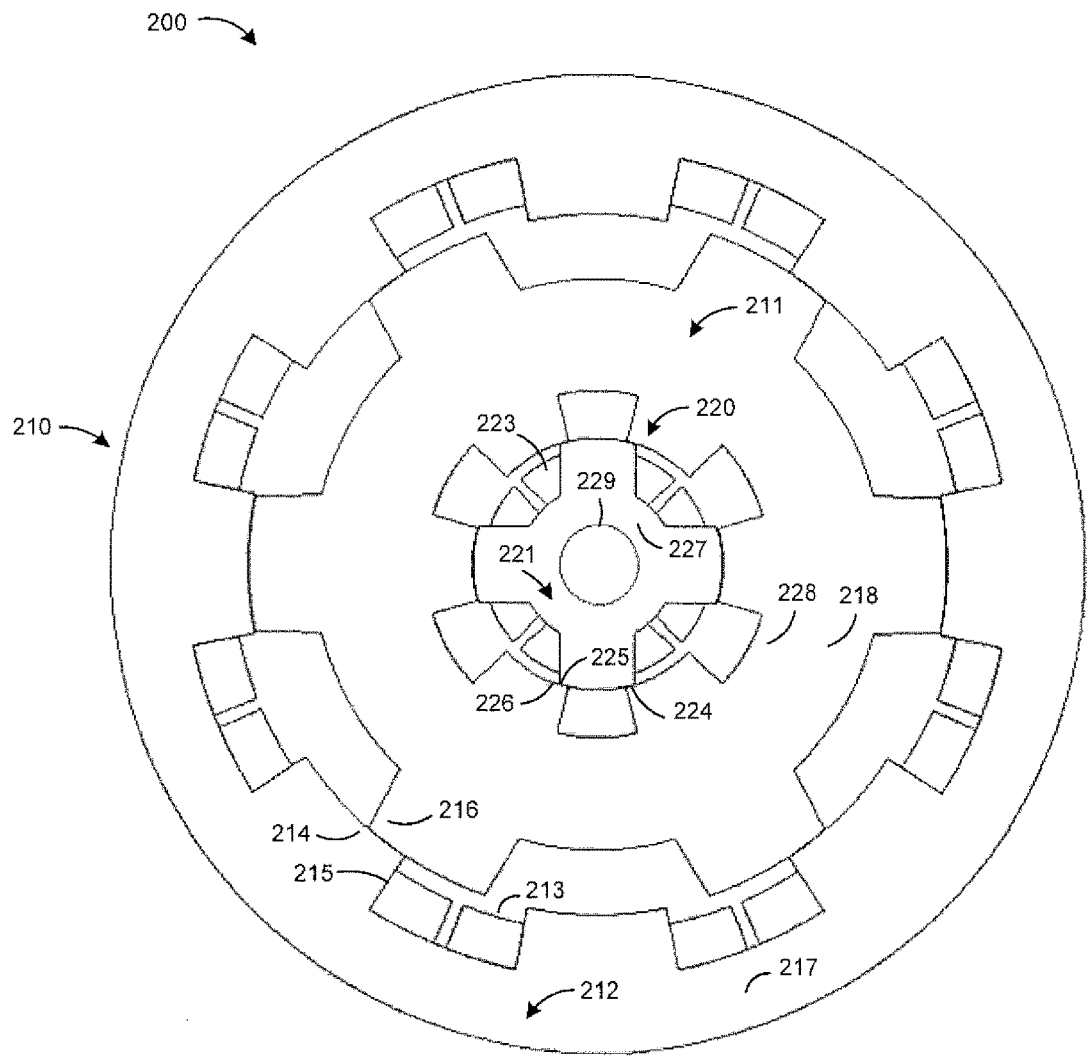
FIG. 2A is a cross-sectional view of a switched reluctance machine in accordance with another example embodiment.
Figure 2B:
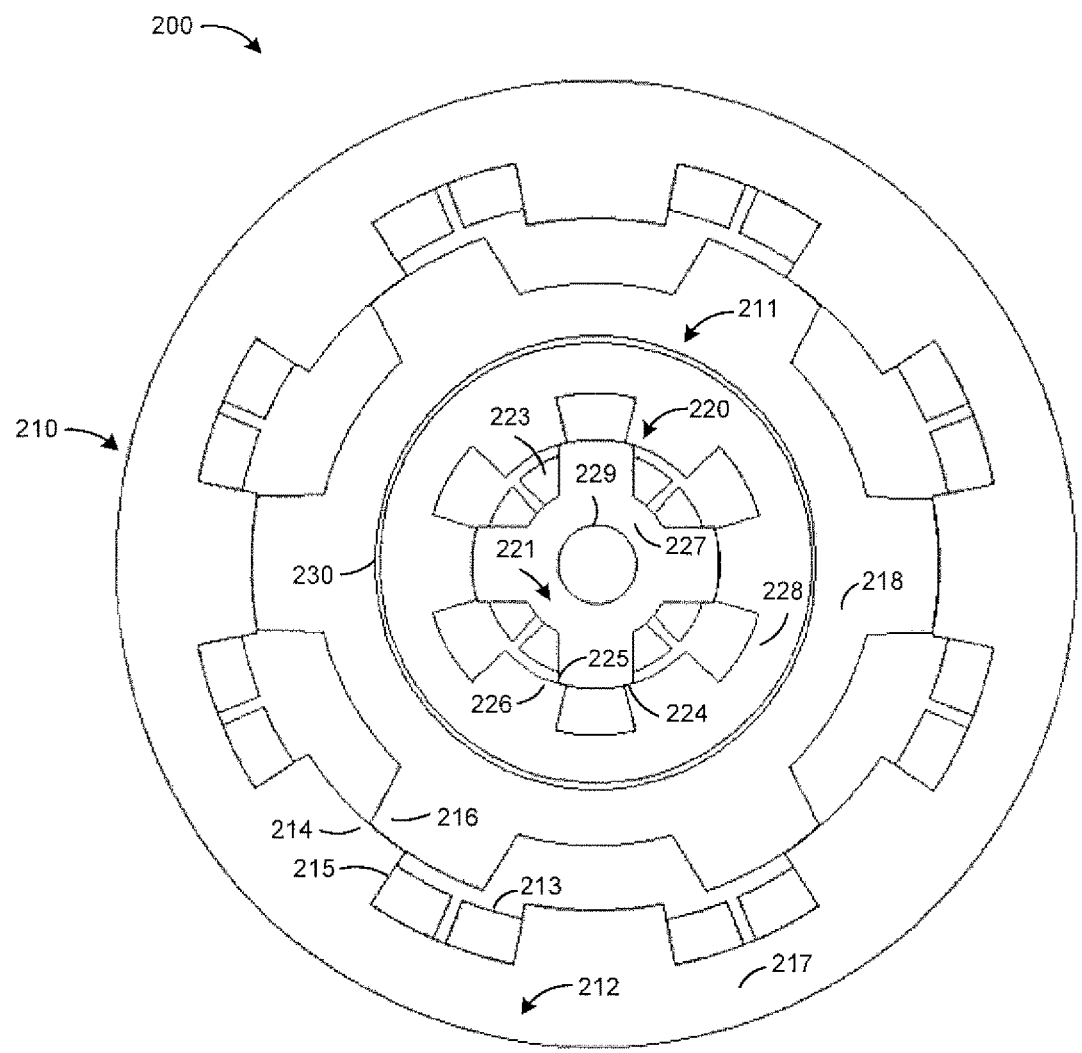
FIG. 2B is the switched reluctance machine of FIG. 2A with insulation in the exterior rotor.
Figure 2C:
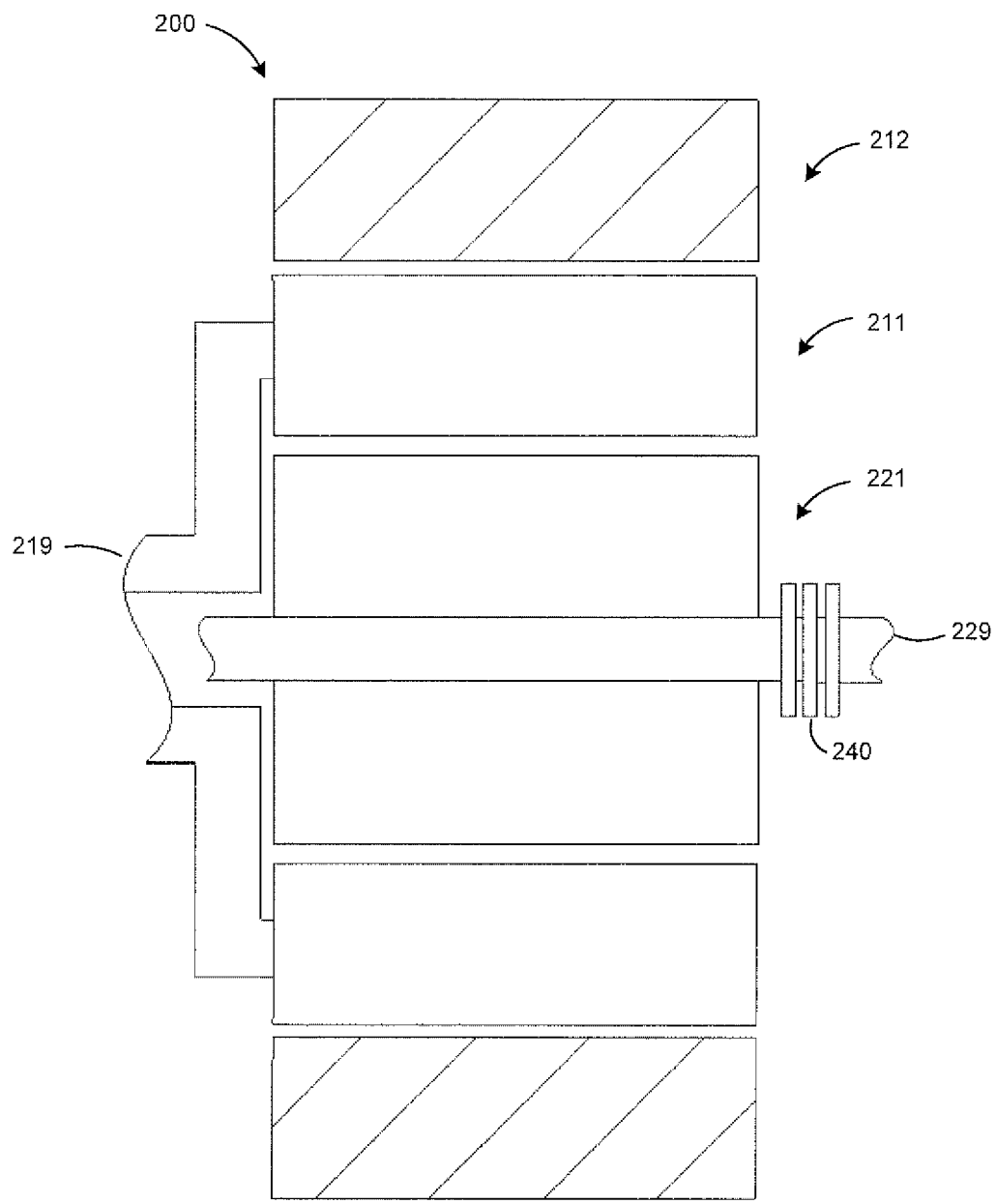
FIG. 2C is a cross-sectional side view of the switched reluctance machine of FIG. 2A.

Reference is next made to FIGS. 2A-2C illustrating different views of a switched reluctance machine 200 according to another example embodiment. FIG. 2A illustrates a cross-sectional view of the switched reluctance machine 200.

The switched reluctance machine 200 consists of an exterior rotor 211, an interior rotor 221, and a stator 212. In this embodiment, the stator 212 is placed outermost, which encircles the exterior rotor 211 and the interior rotor 221 concentrically. The stator 212 and the exterior part of the exterior rotor 211 form an exterior switched reluctance machine 210. The interior part of the exterior rotor 211 and the interior rotor 221 form an interior switched reluctance machine 220.

The interior switched reluctance machine 220 has no fixed stator but has a "floating stator", which in this case is the interior rotor 221. The interior switched reluctance machine 220 is composed of two rotational parts: the exterior rotor 211 and the interior rotor 221. The relative motion between the exterior rotor 211 and the interior rotor 221 defines the magnetic field of the interior switched reluctance machine 220. Since the exterior rotor 211 is shared by both the stator 212 and the interior rotor 221, both the exterior side and the interior side of the exterior rotor 211 are salient with exterior poles 216 and interior poles 226, respectively. This may have the advantage of achieving a higher aligned inductance to unaligned inductance ratio so that higher torque density and power density may be realized.

The exterior switched reluctance machine 210 contains an exterior part of the exterior rotor 211, a stator 212, and exterior coils 213, which are wound on the stator 212. The stator 212 is also salient with stator pole 215. An air gap 214 is formed between the exterior rotor poles 216 and the stator poles 215. The exterior coil windings 213 generate magnetic flux through the stator poles 215. The flux penetrates the air gap 214 between the stator poles 215 and the exterior rotor poles 216 and then goes into the exterior rotor 211. The flux between the exciting stator poles and the corresponding rotor poles tends to align the exterior rotor poles 216 with the exciting stator poles 215 so that the rotor rotates, thus providing the motoring operation.

The exciting stator coils change phase from one pole to another in sequence according to the rotor position so that the motor keeps rotating. The flux then splits by half into the back iron 218 of the exterior rotor 211 and merges again at the other end of the exterior rotor pole 216. It then again goes through the exterior rotor pole 216, the exterior air gap 214, and the exterior stator pole 215 on the other side of the exterior rotor 211. Eventually, the flux splits again in the stator back iron 217 and merges at the base of the stator pole 215 where the flux is generated. As mentioned before, the flux paths described in this application are fore illustration purposes only.

The interior switched reluctance machine 220 contains an interior rotor 221, an interior part of the exterior rotor 211, and interior coils 223, which are wound on the interior rotor 221. The interior rotor 221 is salient with rotor poles 225, and the interior part of the exterior rotor 211 is salient with interior rotor poles 226. An air gap 224 is formed between the interior rotor poles 225 and the interior poles 226 of the exterior rotor 211. The interior coil windings 223 generate magnetic flux through the interior rotor poles 225. The flux penetrates the air gap 224 between the interior rotor poles 225 and the interior poles 226 of the exterior rotor 211 and then goes into the exterior rotor 211. The flux between the exciting interior rotor poles 225 and the corresponding rotor poles 226 of the exterior rotor 211 tends to align the interior rotor poles 226 of the exterior rotor 211 with the exciting interior poles 225, providing the motoring operation. The flux then splits and travels through the back iron 228 of the exterior rotor 211 to the other end. It then again goes through the interior rotor poles 226 of the exterior rotor 211, the interior air gap 224, and the interior rotor pole 225 on the other side of the interior rotor 221. Eventually, the flux splits in the interior rotor back iron 227 around the shaft 229 and merges at the base of the interior rotor pole 225 where the flux is generated.

The switched reluctance machine 200 operates as a motor as described above. In some other cases, the exterior switched reluctance machine 210 and the interior switched reluctance machine 220 both provide generator operations. In some further cases, one of the exterior switched reluctance machine 210 and the interior switched reluctance machine 220 provide the motor operation, and the other of the exterior switched reluctance machine 210 and the interior switched reluctance machine 220 provide the generator operation.

The exterior rotor 211 and the interior rotor 221 are concentrically aligned sharing the same rotating axis. The exterior rotor 211 is designed so that the flux paths described above function independently without flux coupling and the exterior switched reluctance machine 210 and the interior switched reluctance machine 220 work independently.

Reference is next made to FIG. 2B, illustrating the switched reluctance machine 200 of FIG. 2A with the addition of an insulation layer 230 inserted in the exterior rotor 211 to separate the flux paths of the exterior switched reluctance machine 210 and the interior switched reluctance machine 220.

Reference is next made to FIG. 2C, illustrating another embodiment of switched reluctance machine 200 of FIG. 2A. In this embodiment, the coil windings 223 wound on the interior rotor 221 rotate along with the interior rotor 221 so that slip rings 240 are needed to conduct currents between a DC link and the rotating coil windings 223.

The switched reluctance machine 200 also provides two output paths: one from the exterior rotor 211, and the other from the interior rotor 221. The exterior rotor 211 connects directly with the exterior shaft 219 and the interior rotor 221 connects directly with the interior shaft 229, as illustrated in FIG. 2C. The exterior rotor 211, thus the exterior output shaft 219, can be independently controlled by the stator 212 of the exterior switched reluctance machine 210. The interior rotor 221, thus the interior output shaft 229, can be controlled by the interior coil windings 223 of the interior switched reluctance machine 220 with a relative speed difference from the exterior rotor 211.

As illustrated in FIG. 2C, the exterior output shaft 219 is placed at one direction while the interior output shaft 229 has terminal ends at both directions. This is for illustration purposes only. In some other embodiments, the output shafts 219 and 229 may be placed toward the opposite direction or have different number of terminal ends without affecting the functionality of the switched reluctance machine 200.

The switched reluctance machine 200 may have any number of exterior poles 216 of the exterior rotor 211, stator poles 215, exterior coils 213, interior poles 226 of the exterior rotor 211, interior rotor poles 225, and interior coil windings 223. Various combinations illustrated in this application as for illustration purposes only. Various embodiments of switched reluctance machine may have any number of stator poles, rotor poles, and coil windings. In some cases, pole pair patterns, such as stator pole to rotor pole ratios of 6/4, 8/6, 6/8, 6/10, 12/8, 8/14 etc., are used.

Figure 3A:
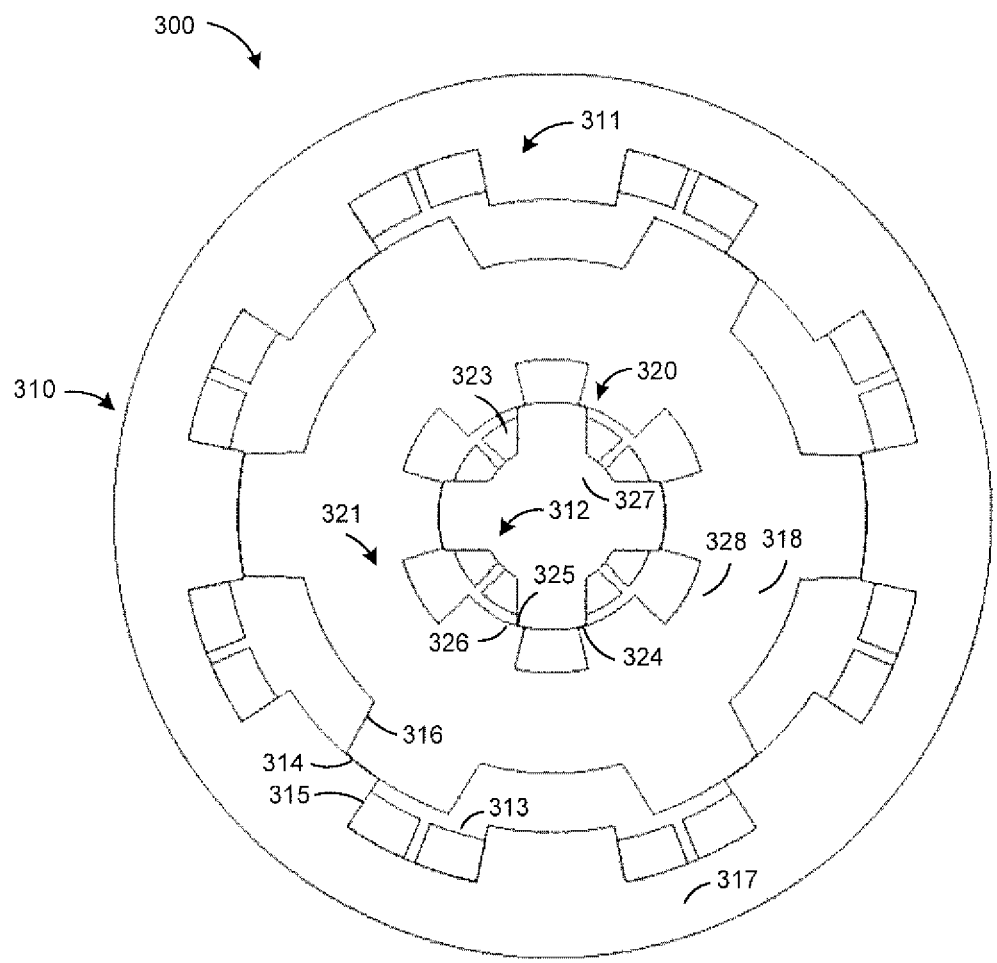
FIG. 3A is a cross-sectional view of a switched reluctance machine in accordance with another example embodiment.
Figure 3B:
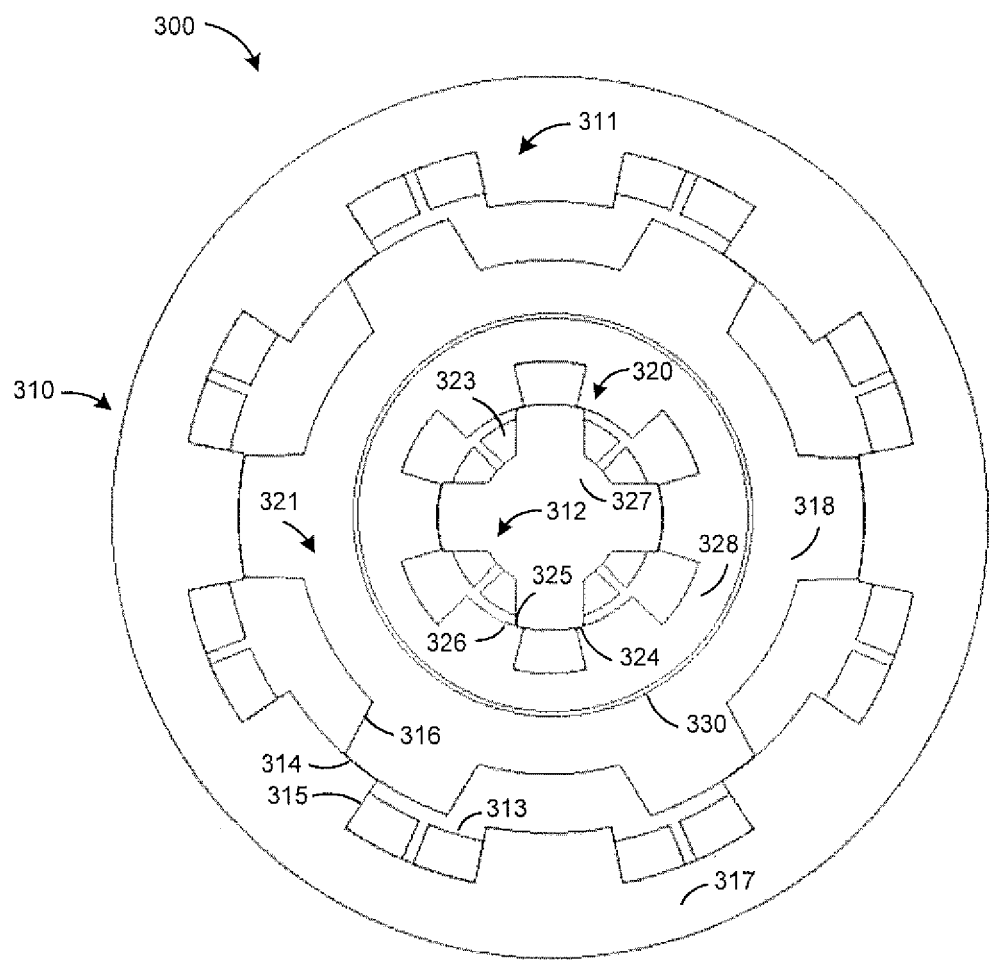
FIG. 3B is the switched reluctance machine of FIG. 3A with insulation in the interior rotor.
Figure 3C:
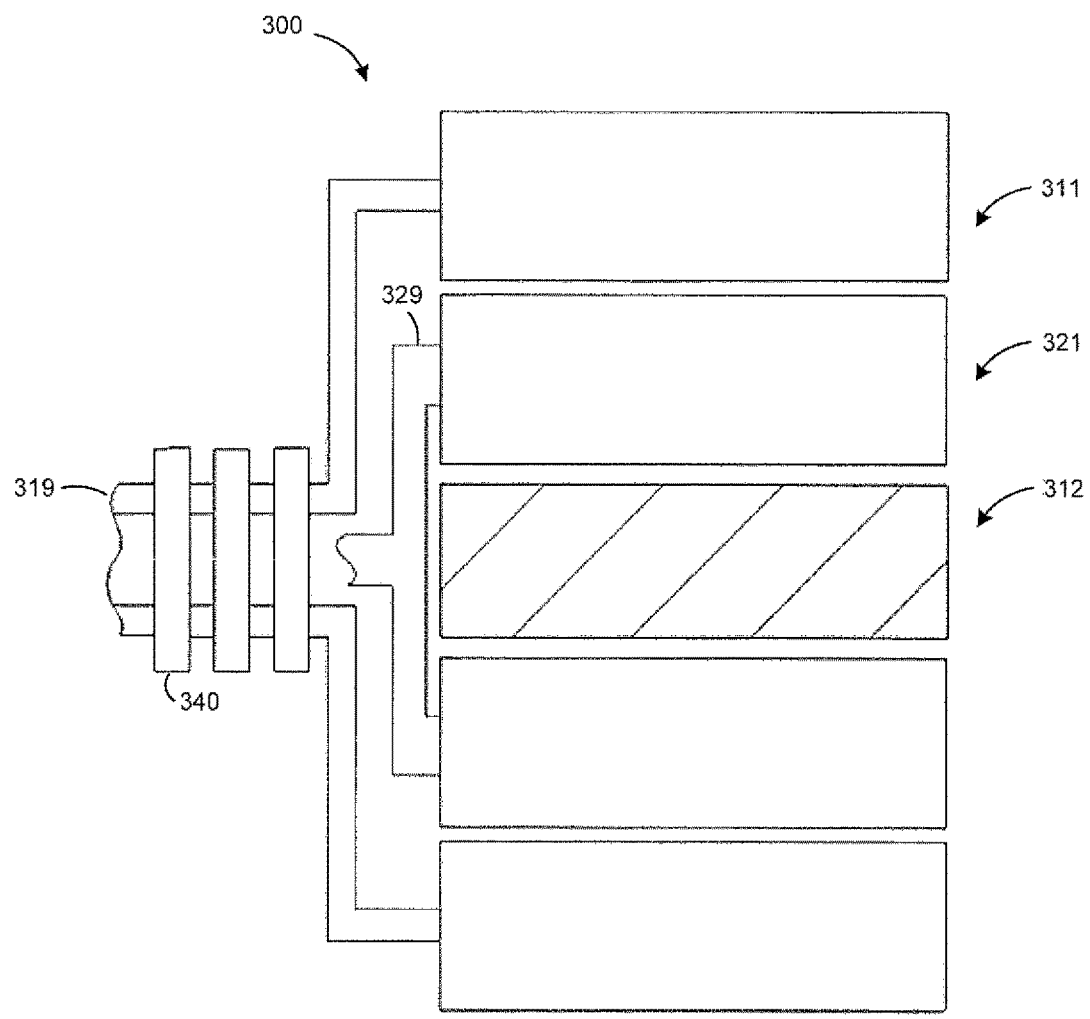
FIG. 3C is a cross-sectional side view of the switched reluctance machine of FIG. 3A.

Reference is next made to FIGS. 3A-3C illustrating different views of a switched reluctance machine 300 according to another example embodiment. FIG. 3A illustrates a cross-sectional view of the switched reluctance machine 300.

The switched reluctance machine 300 consists of an exterior rotor 311, an interior rotor 321, and a stator 312. In this embodiment, the stator 312 is placed innermost, which is encircled by the exterior rotor 311 and the interior rotor 321 concentrically. The exterior rotor 311 and the exterior part of the interior rotor 321 form an exterior switched reluctance machine 310 and the interior part of the interior rotor 321 and the stator 312 form an interior switched reluctance machine 320.

The exterior switched reluctance machine 310 has no fixed stator but has a "floating stator", which in this case is the exterior rotor 311. The exterior switched reluctance machine 310 is composed of two rotational parts: the exterior rotor 311 and the interior rotor 321. The relative motion between the exterior rotor 311 and the interior rotor 321 defines the magnetic field of the exterior switched reluctance machine 310. Since the interior rotor 321 is shared by both the stator 312 and the exterior rotor 311, both the exterior side and the interior side of the interior rotor 321 are salient with exterior poles 316 and interior poles 326, respectively. This provides the advantage of achieving a higher aligned inductance to unaligned inductance ratio so that higher torque density and power density can be realized.

The exterior switched reluctance machine 310 contains the exterior part of the interior rotor 321, the exterior rotor 311, and exterior coils 313, which are wound on the exterior rotor 311. The exterior rotor 311 is also salient with exterior rotor pole 315. An air gap 314 is formed between the exterior rotor poles 315 and the exterior part of the interior rotor poles 316. The exterior coil windings 313 generate magnetic flux through the exterior rotor poles 315.

According to one example of flux path in the exterior switched reluctance machine 310, the flux penetrates the air gap 314 between the exterior rotor poles 315 and the exterior poles 316 of the interior rotor 321 and then goes into the interior rotor 321. The flux between the exciting exterior rotor poles and the corresponding rotor poles tends to align the exterior poles 316 of the interior rotor 321 with the exciting exterior rotor poles 315 so that the rotor rotates, thus providing the motoring operation.

The exciting stator coils change phase from one pole to another in sequence according to the rotor position so that the motor keeps rotating. The flux then splits by half into the exterior portion of the back iron 318 of the interior rotor 321 and merges again at the other end of the exterior poles 316 of the interior rotor 321. It then again goes through the exterior poles 316 of the interior rotor 321, the exterior air gap 314, and the exterior rotor pole 315 on the other side of the exterior rotor 311. Eventually, the flux splits again in the stator back iron 317 and merges at the base of the exterior rotor pole 315 where the flux is generated.

The interior switched reluctance machine 320 contains the stator 312, an interior part of the interior rotor 321, and interior coils 323, which are wound on the stator 312. The stator 312 is salient with stator poles 325, and the interior part of the interior rotor 321 is salient with interior poles 326 of interior rotor 321. An air gap 324 is formed between the stator poles 325 and the interior poles 326 of the interior rotor 321. The stator coil windings 323 generate magnetic flux through the stator poles 325.

According to one example of flux path in the interior switched reluctance machine 320, the flux penetrates the air gap 324 between the stator poles 325 and the interior poles 326 of the interior rotor 321 and then goes into the interior rotor 321. The flux between the exciting stator poles and the corresponding interior rotor poles tends to align the interior rotor poles 326 of the interior rotor 321 with the exciting stator poles 325, providing the motoring operation.

The flux then splits and travels through the interior portion of the back iron 328 of the interior rotor 321 to the other end. It then again goes through the interior rotor poles 326 of the interior rotor 321, the interior air gap 324, and the stator pole 325 on the other side of the stator 312. Eventually, the flux travels back to the stator pole 325 where the flux is generated.

The switched reluctance machine 300 operates as a motor as described above. In some other cases, the exterior switched reluctance machine 310 and the interior switched reluctance machine 320 both provide generator operations. In some further cases, one of the exterior switched reluctance machine 310 and the interior switched reluctance machine 320 provide the motor operation, and the other of the exterior switched reluctance machine 310 and the interior switched reluctance machine 320 provide the generator operation.

The exterior rotor 311 and the interior rotor 321 are concentrically aligned sharing the same rotating axis. The interior rotor 321 is designed so that the flux paths described above are independently functioning without flux coupling and the exterior switched reluctance machine 310 and the interior switched reluctance machine 320 work independently.

Reference is next made to FIG. 3B, illustrating the switched reluctance machine 300 of FIG. 3A but having an insulation layer 330 inserted in the interior rotor 321 to separate the flux paths of the exterior switched reluctance machine 310 and the interior switched reluctance machine 320.

Reference is next made to FIG. 3C, illustrating another embodiment of switched reluctance machine 300 of FIG. 3A. In this embodiment, the coil windings 313 wound on the exterior rotor 311 rotate along with the exterior rotor 311 so that slip rings 340 are needed to conduct currents between a DC link and the rotating coil windings 313.

The switched reluctance machine 300 also provides two output paths: one from the exterior rotor 311, and the other from the interior rotor 321. The exterior rotor 311 connects directly with the exterior shaft 319 and the interior rotor 321 connects directly with the interior shaft 329, as illustrated in FIG. 3C. The interior rotor 321, thus the interior output shaft 329, can be independently controlled by the stator 312 of the interior switched reluctance machine 320. The exterior rotor 311, thus the exterior output shaft 319, can be controlled by the exterior coil windings 313 of the exterior switched reluctance machine 310 with a relative speed difference from the interior rotor 321.

As illustrated in FIG. 3C, the exterior output shaft 319 and the interior output shaft 329 are placed toward one direction. This is for illustration purposes only. In some other embodiments, exterior output shaft 319 and the interior output shaft 329 may be placed toward the opposite direction or have different number of terminal ends without affecting the functionality of the switched reluctance machine 300.

The switched reluctance machine 300 may have any number of exterior poles 316 of the interior rotor 321, exterior rotor poles 315, exterior coils 313, interior poles 326 of the interior rotor 321, stator poles 325, and interior coil windings 323. Various combinations illustrated in this application as for illustration purposes only. Various embodiments of switched reluctance machine may have any number of stator poles, rotor poles, and coil windings. In some cases, pole pair patterns, such as stator pole to rotor pole ratios of 6/4, 8/6, 6/8, 6/10, 12/8, 8/14 etc., are used.

Figure 4:
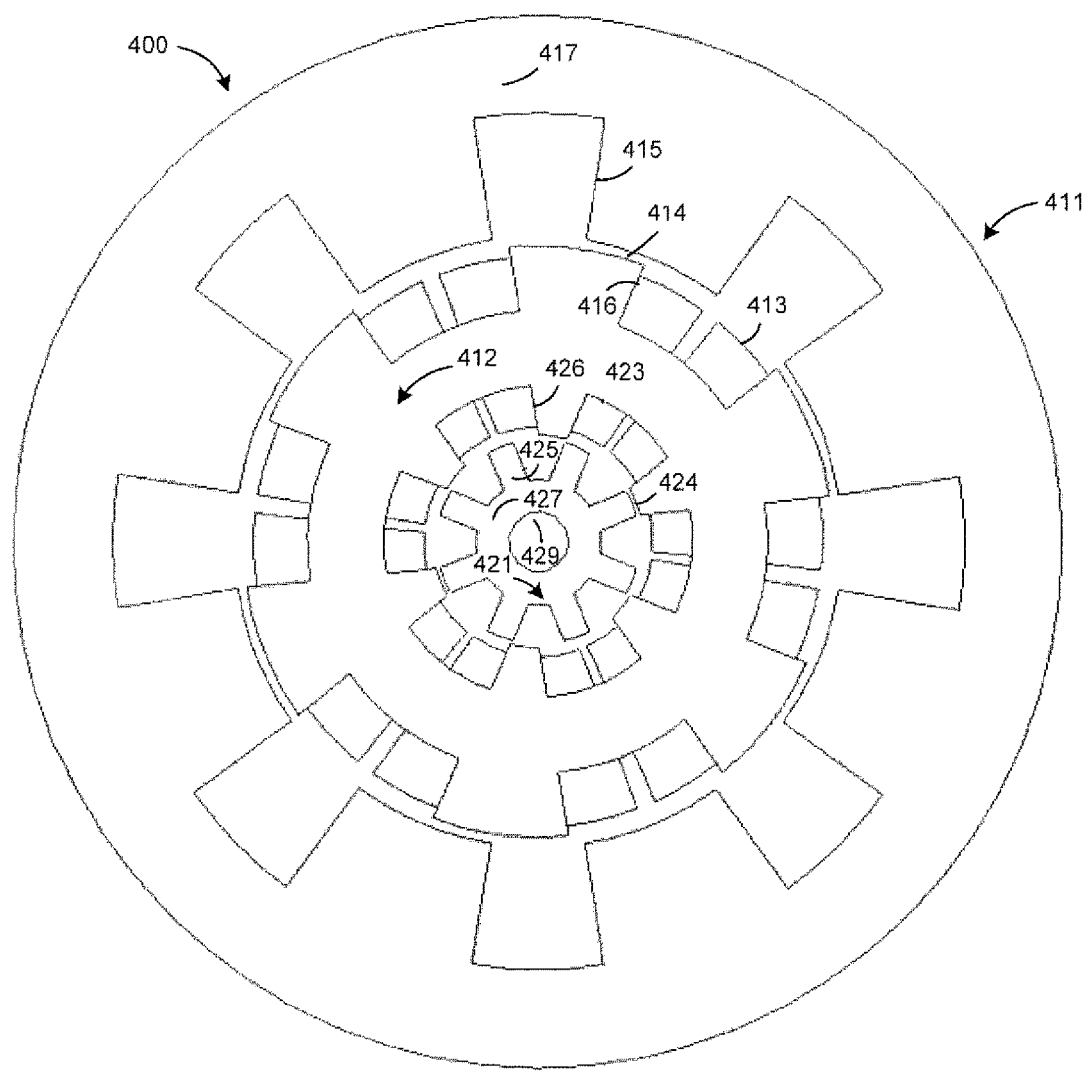
FIG. 4 is a cross-sectional view of a switched reluctance machine in accordance with another example embodiment.

Reference is next made to FIG. 4, illustrating a switched reluctance machine 400 according to another example embodiment. The switched reluctance machine 400 consists of an exterior rotor 411, an interior rotor 421, and a stator 412. In this embodiment, the stator 412 is placed in between the exterior rotor 411 and the interior rotor 421 concentrically.

In this embodiment, the exterior rotor 411 and the interior rotor 421 are designed to rotate simultaneously so that the double rotors 411 and 421 function as one mechanical output. Accordingly, the switched reluctance machine 400 has only one output path. The utilization of the double fields of the double rotors may have the advantage of enhancing the power density and torque density of the switched reluctance machine 400.

In some cases, the exterior rotor 411 and the interior rotor 421 are designed to rotate simultaneously by using mechanical lock devices to lock the exterior rotor 411 with the interior rotor 421. In some other cases, the exterior rotor 411 and the interior rotor 421 are designed to rotate simultaneously by utilizing the magnetic field and speed feedback control to synchronize the double rotors 411 and 421.

In this embodiment, the flux of the exterior rotor 411 and the flux of the interior rotor 421 are linked to form a loop together. The exterior side of the stator 412 is salient with exterior stator poles 416 and the interior side of the stator 412 is salient with interior stator poles 426. The exterior rotor 411 and the interior rotor 421 are also salient with exterior rotor poles 415 and interior rotor poles 425, respectively. The exterior coils 413 are wound on the exterior side of the stator 412 while the interior coils 423 are wound on the interior side of the stator 412. An exterior air gap 414 is formed between the exterior poles 416 of the stator 412 and the exterior rotor poles 415. An interior air gap 424 is formed between the interior poles 426 of the stator 412 and the interior rotor poles 425.

The exterior coil windings 413 and the interior coil windings 423 work simultaneously to generate magnetic flux through the stator poles 416 and 426. According to one example of flux path, the flux penetrates both the exterior air gap 414 and the interior air gap 424 into the exterior rotor 411 and the interior rotor 421, respectively. The flux between the exciting stator poles and the corresponding rotor poles tends to align the exterior rotor poles 415 and the interior rotor poles 425 with the exciting stator poles 416 and 426 so that the exterior rotor 411 and the interior rotor 421 rotate simultaneously, thus providing the motoring operation.

The exciting stator coils change phase from one pole to another in sequence according to the rotor position so that the motor keeps rotating. The flux in the exterior rotor 411 then splits by half into the back iron 417 of the exterior rotor 411 and merges again at the other end of the exterior rotor pole 415. The flux in the interior rotor 421 also splits by half into the back iron 427 of the interior rotor 421 and merges again at the other end of the exterior rotor pole 425. The flux then again crosses the exterior air gap 414 and the interior air gap 424 into the exterior stator poles 416 and the interior stator poles 426 of the stator 412 and completes a loop.

In some cases, the switched reluctance machine 400 operates as a motor. In some other cases, the switched reluctance machine 400 operates as a generator.

As illustrated in FIG. 4, mechanical output is placed on the shaft 429 to combine the output torque from both the exterior rotor 411 and the interior rotor 421. In other cases, the mechanical output can be placed connecting to the exterior rotor 411. In some further cases, the mechanical output can be placed connecting to both the exterior rotor 411 and the interior rotor 421.

The switched reluctance machine 400 is designed so that the number of the exterior poles 415 and the number of the interior poles 425 are the same. Each one of the exterior poles 415 is radially aligned with one corresponding interior pole 425. Flux always conducts through pairs of rotor poles at the same time since the exterior rotor 411 and the interior rotor 421 are locked together and always have the same rotating speed. The number of the exterior and interior stator poles 416 and 426 is different from the number of the rotor poles to enable self-starting capability. As long as the above conditions are met, any number of stator and rotor poles may be used in the switched reluctance machine 400 of FIG. 4.

Figure 5:
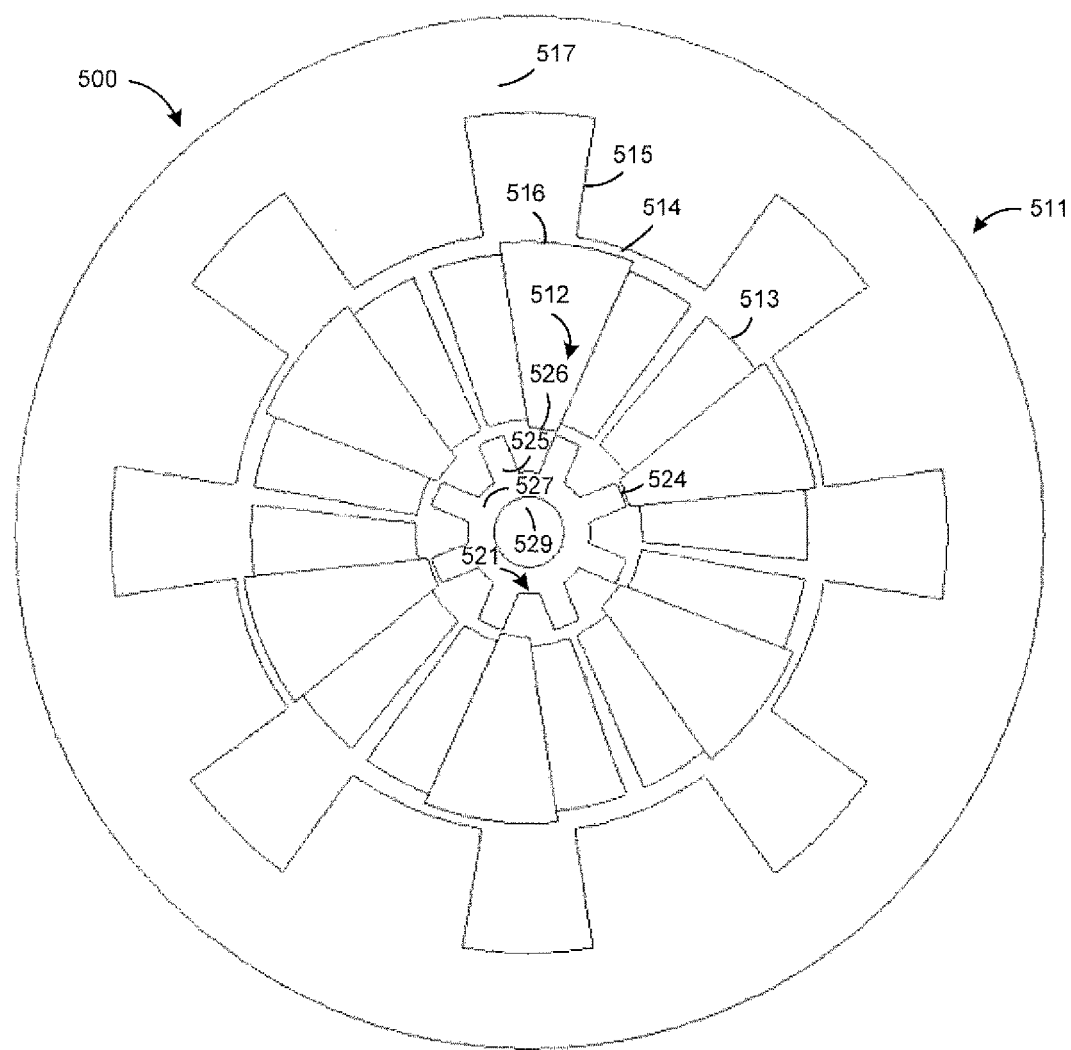
FIG. 5 is a cross-sectional view of a switched reluctance machine in accordance with another example embodiment.

Reference is next made to FIG. 5 illustrating a switched reluctance machine 500 according to another example embodiment. The switched reluctance machine 500 consists of an exterior rotor 511, an interior rotor 521, and a stator 512, which is placed in between the exterior rotor 511 and the interior rotor 521 concentrically.

The switched reluctance machine 500 is designed to function as one mechanical output, so that the exterior rotor 511 and the interior rotor 521 are always rotating simultaneously. The switched reluctance machine 500 may have the same design as the switched reluctance machine 400 of FIG. 4 with the exception of configuration of the stator 512.

Stator 512 of FIG. 5 is composed of several separated stator columns 516. All the stator columns 516 are mechanically connected to the housing. Each stator column 516 is wound by stator coils 513 on both sides. An advantage of this configuration is a reduced weight of the stator since the connections between the stator columns 516 are cut off. Another advantage of this configuration is that the winding areas for stator coils 513 is increased, thereby allowing for enhanced power density.

In this embodiment, the flux of the exterior rotor 511 and the flux of the interior rotor 521 are linked to form a loop together. The exterior rotor 511 and the interior rotor 521 are salient with exterior rotor poles 515 and interior rotor poles 525, respectively. An exterior air gap 514 is formed between the exterior rotor poles 515 and the exterior side of the stator column 516. An interior air gap 524 is formed between the interior rotor poles 525 and the interior side of the stator column 516.

The stator coil windings 513 generate a magnetic flux in the stator columns 516. The flux penetrates both the exterior air gap 514 and the interior air gap 524 into the exterior rotor 511 and the interior rotor 521, respectively. The flux between the exciting stator columns 516 and the corresponding rotor poles tends to align the exterior rotor poles 515 and the interior rotor poles 525 with the exciting stator columns 516 so that the exterior rotor 511 and the interior rotor 521 rotate simultaneously, thus providing the motoring operation.

The exciting stator coils change phase from one pole to another in sequence according to the rotor position so that the motor keeps rotating. The flux in the exterior rotor 511 then splits by half into the back iron 517 of the exterior rotor 511 and merges again at the other end of the exterior rotor pole 515. The flux in the interior rotor 521 also splits by half into the back iron 527 of the interior rotor 521 and merges again at the other end of the exterior rotor pole 525. The flux then again crosses the exterior air gap 514 and the interior air gap 524 into the stator columns 516 and completes a loop.

As illustrated in FIG. 5, mechanical output is placed on the shaft 529 to combine the output torque from both the exterior rotor 511 and the interior rotor 521 provided the exterior rotor 511 and the interior rotor 521 are mechanically synchronized.

Similar to switched reluctance machine 400, the number of the exterior poles 515 and the number of the interior poles 525 in the switched reluctance machine 500 are the same. Each one of the exterior poles 515 is radially aligned with one corresponding interior pole 525. Flux always conducts through pairs of rotor poles at the same time since the exterior rotor 511 and the interior rotor 521 are locked together and always have the same rotating speed. The number of the stator columns 516 is different from the number of the rotor poles to enable self-starting capability.

Figure 6:
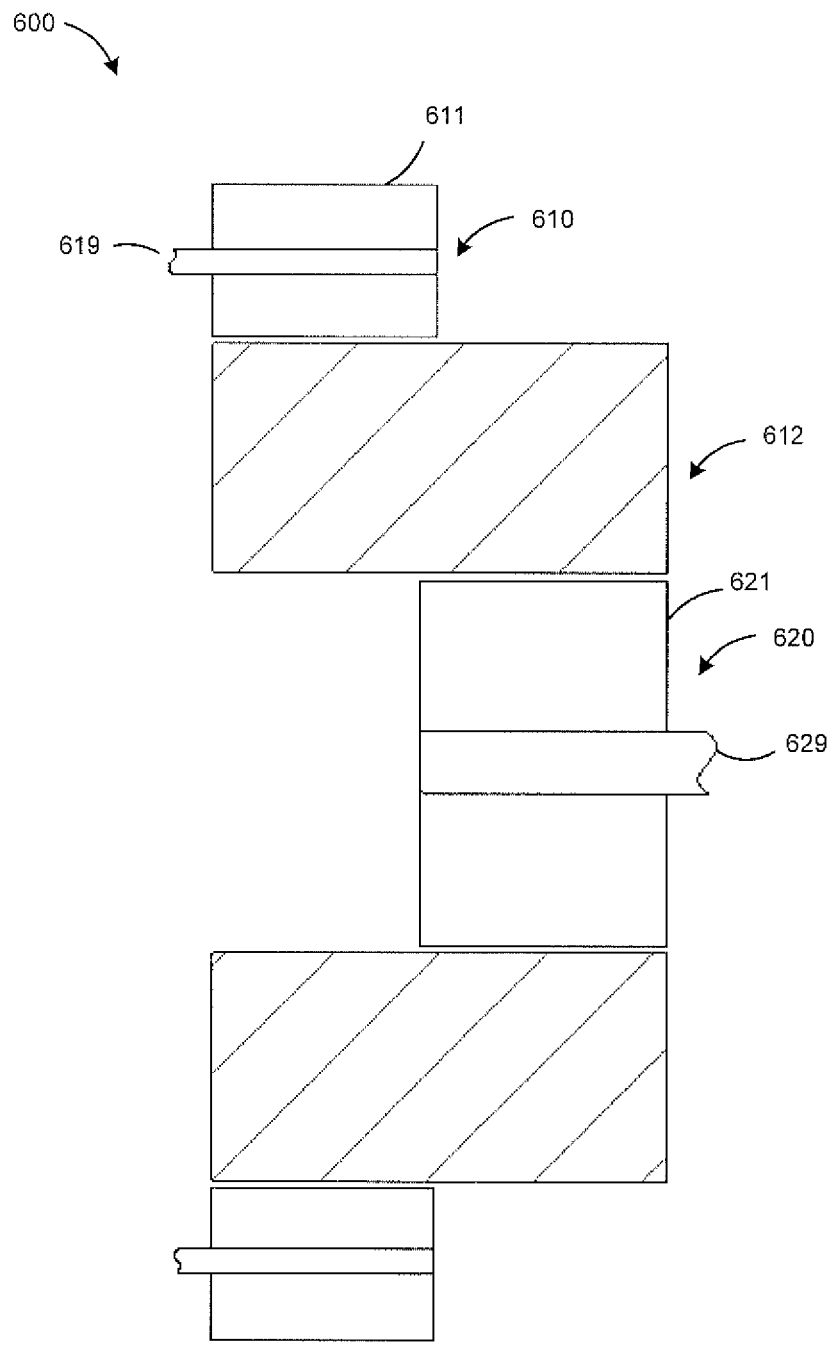
FIG. 6 is a cross-sectional side view of a switched reluctance machine in accordance with an example embodiment.

Reference is next made to FIG. 6, illustrating a side view of a switched reluctance machine 600 according to an example embodiment. The switched reluctance machine 600 consists of an exterior rotor 611, an interior rotor 621, and a stator 612 between the exterior rotor 611 and the interior rotor 621. The stator 612 is shared by both the two rotors 611 and 621, forming an exterior switched reluctance machine 610 and an interior switched reluctance machine 620, respectively. Coil windings on stator 612 provide magnetic fields for both the exterior rotor 611 and the interior rotor 621.

Switched reluctance machine 600 contains two output shafts 619 and 629. Output shaft 619 is connected to the exterior rotor 611, and output shaft 629 is connected to the interior rotor 621.

The switched reluctance machine 600 may have the same design as the switched reluctance machine 100 of FIG. 1 with the exception that the double rotors are displaced at different positions along the axial direction which are not radially aligned.

Displacing the double rotors at different axial positions may provide the advantage of simplicity of machine construction and more flexibility in powertrain assembly, especially for those situations where assembly space is limited and predetermined by other components in the powertrain. In addition, this configuration allows for more room to support the stator from the machine housing to reduce the cantilever drawback of the stator construction so that more rigidity and durability of the double-rotor switched reluctance machine can be achieved.

The positions of the double rotors and the directions of the output shafts of switched reluctance machine 600 of FIG. 6 are for illustration purposes only. Other positions of the double rotors and other directions of the output shafts may be used in other example embodiments of switched reluctance machine 600.

Figure 7:
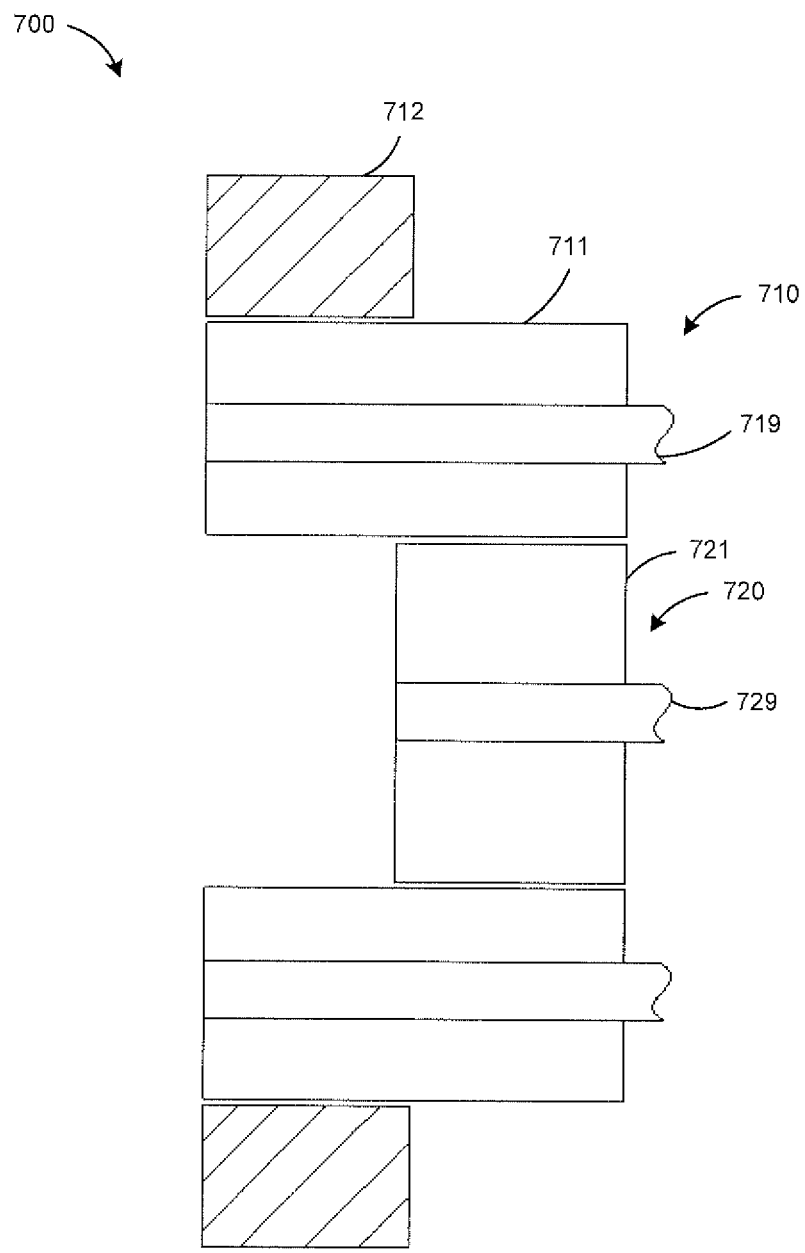
FIG. 7 is a cross-sectional side view of a switched reluctance machine in accordance with another example embodiment.

Reference is next made to FIG. 7, illustrating a switched reluctance machine 700 according to another example embodiment. The double-rotor switched reluctance machine 700 consists of an exterior rotor 711, an interior rotor 721, and a stator 712. The exterior rotor 711 is placed between the stator 712 and the interior rotor 721.

The stator 712 and the exterior rotor 711 form an exterior switched reluctance machine 710 while the interior rotor 721 serves as a "floating stator" to form an interior switched reluctance machine 720 with the exterior rotor 711. Coil windings on the stator 712 provide the magnetic field for the exterior switched reluctance machine 710 while the coil windings on the interior rotor 721 provide the magnetic field for the interior switched reluctance machine 720. Two output shafts 719 and 729 connect with the exterior rotor 711 and the interior rotor 721, respectively.

The switched reluctance machine 700 may have the same design as the switched reluctance machine 200 of FIG. 2 with the exception that the interior rotor 721 and the stator 712 are displaced at different positions along the axial direction which are not radially aligned.

Displacing the interior rotor 721 and the stator 712 at different axial positions can result in more simplicity in terms of machine construction and more flexibility in powertrain assembly, especially for those situations where assembly space is limited and predetermined by other components in the powertrain.

The positions of the interior rotor 721 and the stator 712 and the directions of the output shafts 719 and 729 of switched reluctance machine 700 of FIG. 7 are for illustration purposes only. Other positions of the interior rotor 721 and the stator 712 and other directions of the output shafts 719 and 729 may be used in other example embodiments of switched reluctance machine 700.

Figure 8:
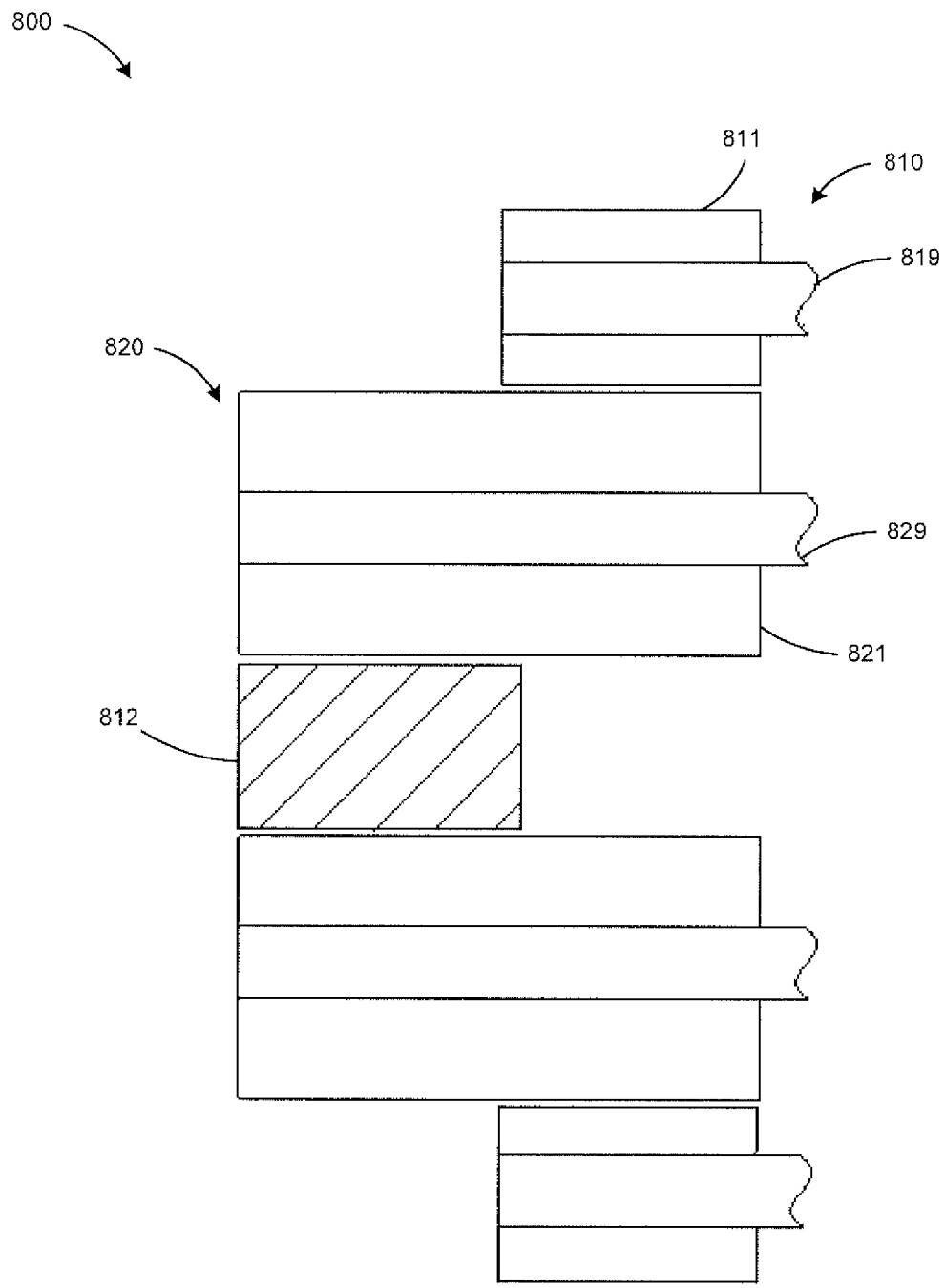
FIG. 8 is a cross-sectional side view of a switched reluctance machine in accordance with a further example embodiment.

Reference is next made to FIG. 8 illustrating a switched reluctance machine 800 according to an example embodiment. The switched reluctance machine 800 consists of an exterior rotor 811, an interior rotor 821, and a stator 812. The interior rotor 821 is placed between the stator 812 and the exterior rotor 811. The stator 812 and the interior rotor 821 form an interior switched reluctance machine 820 while the exterior rotor 811 serves as a "floating stator" to form an exterior switched reluctance machine 810 with the interior rotor 821. Coil windings on the stator 812 provide the magnetic field for the interior switched reluctance machine 820 while the coil windings on the exterior rotor 811 provide the magnetic field for the exterior switched reluctance machine 810. Two output shafts 819 and 829 connect with the exterior rotor 811 and the interior rotor 821, respectively.

The switched reluctance machine 800 may have the same design as the switched reluctance machine 300 with the exception that the exterior rotor 811 and the stator 812 are displaced at different positions along the axial direction which are not radially aligned.

Displacing the exterior rotor 811 and the stator 812 at different axial positions may provide the advantage of more simplicity in terms of machine construction and more flexibility in powertrain assembly, especially for those situations where assembly space is limited and predetermined by other components in the powertrain.

The positions of the interior rotor 821 and the stator 812 and the directions of the output shafts 819 and 829 are illustrated in FIG. 8 as examples only. Other positions of the interior rotor 821 and stator 812 and other positions of output shafts 819 and 829 may be used in other examples of switched reluctance machine 800.

Figure 9A:
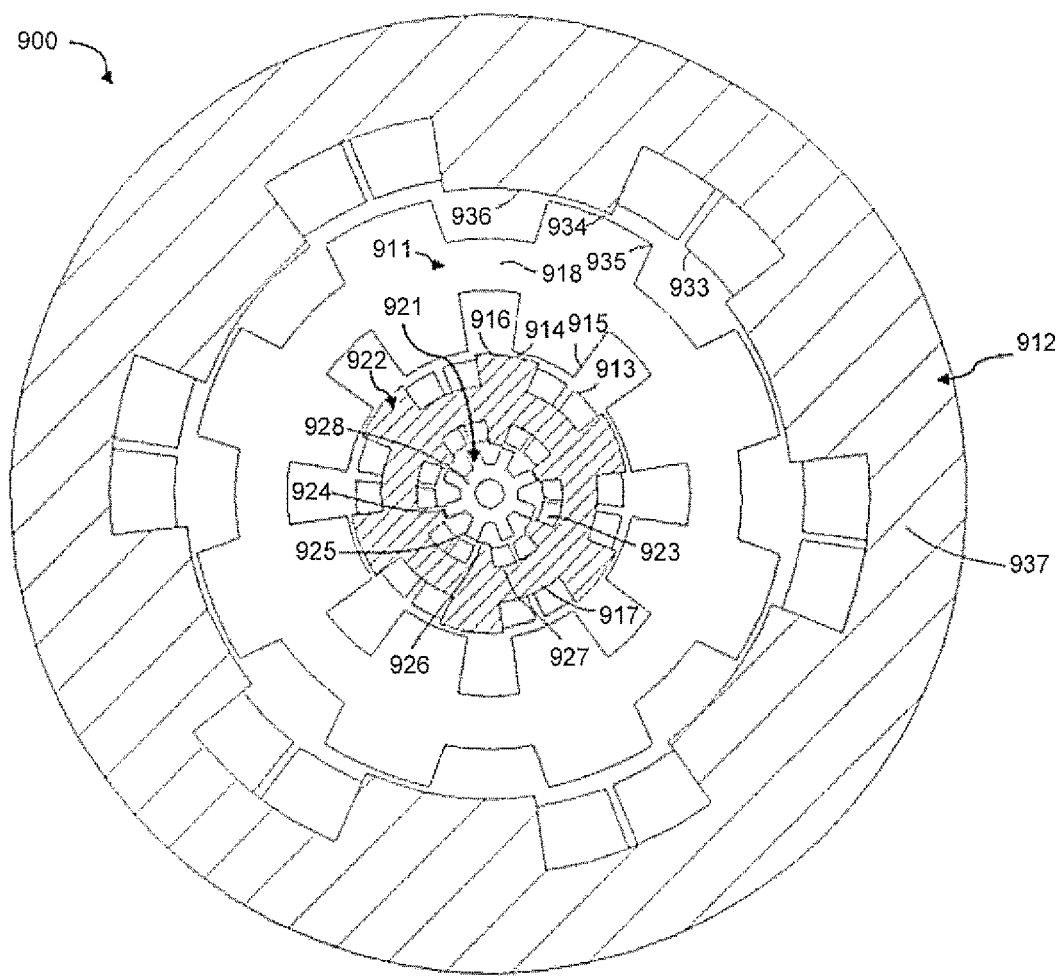
FIG. 9A is a cross-sectional view of a switched reluctance machine in accordance with an example embodiment.
Figure 9B:
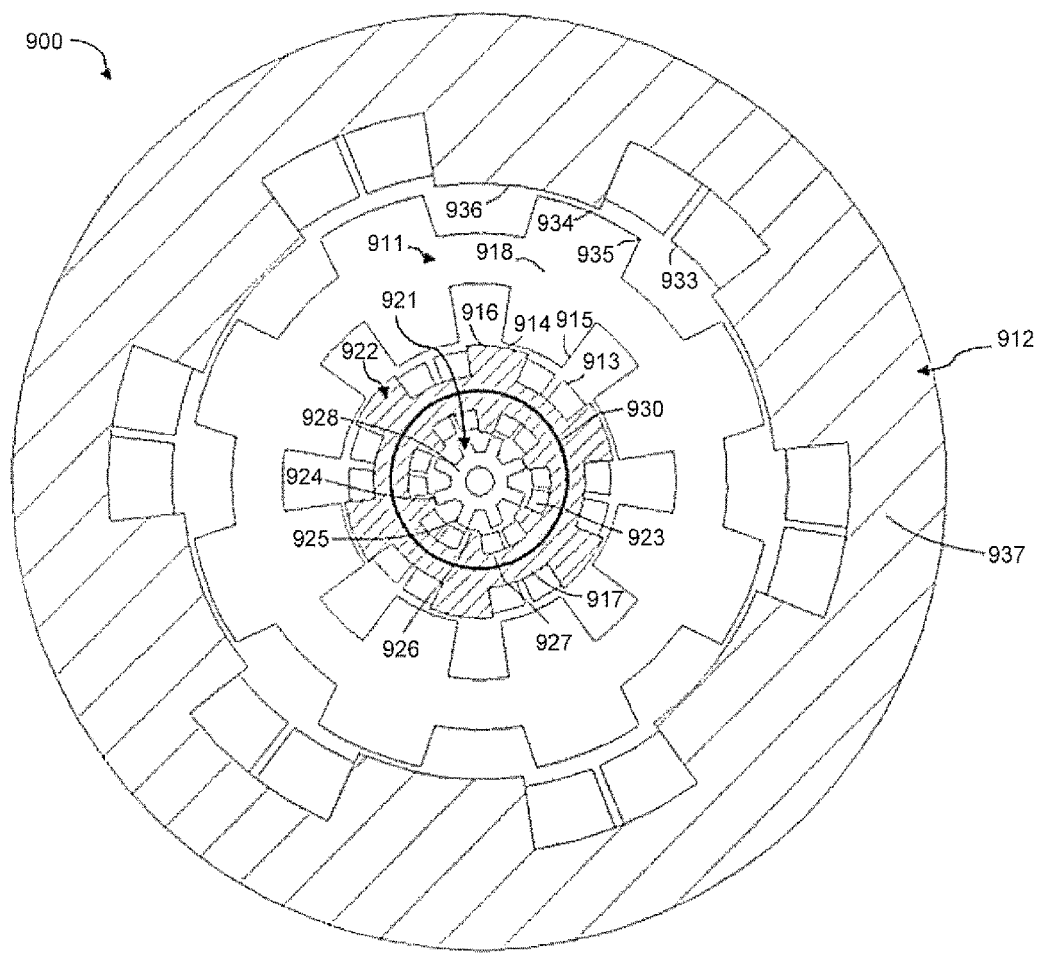
FIG. 9B is the switched reluctance machine of FIG. 9A with insulation in the interior stator.
Figure 9C:
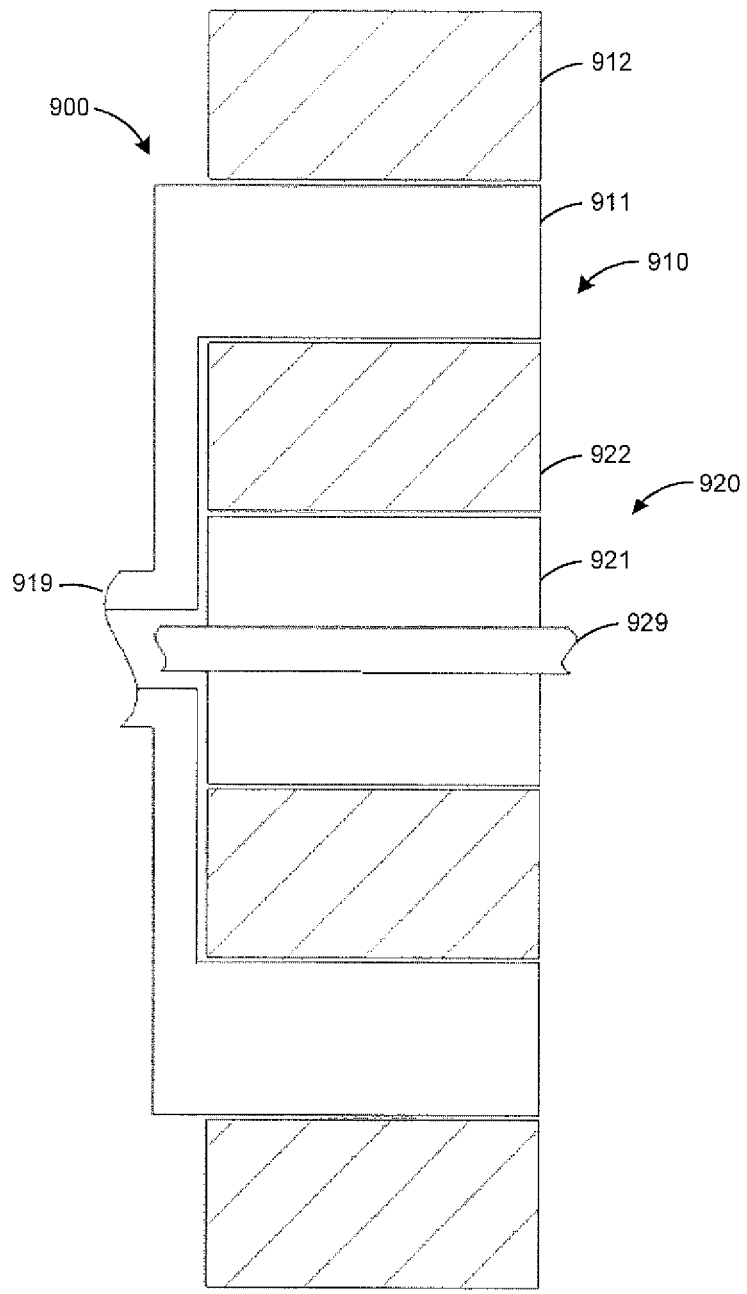
FIG. 9C is a cross-sectional side view of the switched reluctance machine of FIG. 9A.

Referring now to FIGS. 9A-9C illustrating a switched reluctance machine 900 according to a further example. FIG. 9A illustrates a cross-sectional view of the switched reluctance machine 900.

The switched reluctance machine 900 consists of an exterior rotor 911, an interior rotor 921, an exterior stator 912, and an interior stator 922. In this embodiment, the interior stator 922 is placed in between the exterior rotor 911 and the interior rotor 921 concentrically while the exterior rotor 911 is placed in between the exterior stator 912 and the interior stator 922 concentrically.

In contrast to switched reluctance machine 100 of FIG. 1, switched reluctance machine 900 adds an exterior stator 912 outside the exterior rotor 911 concentrically in the radial direction. In this embodiment of FIG. 9A, the exterior rotor 911 becomes double salient on both its exterior side and interior side. The exterior stator 912, the exterior rotor 911, and the exterior side of the interior stator 922 form an exterior switched reluctance machine 910.

The added exterior stator 912 allows for enhanced magnetic flux inside the exterior rotor 911 so that higher power density and torque density may be achieved in the exterior switched reluctance machine 910. The exterior stator 912 has the same number of the stator poles 936 as the exterior poles 916 of the interior stator 922, and each of the exterior stator poles 936 also aligns with the corresponding exterior poles 916 of the interior stator 922 radially.

The interior side of the interior stator 922 and the interior rotor 921 form an interior switched reluctance machine 920.

In some cases, the exterior switched reluctance machine 910 and the interior switched reluctance machine 920 operate independently. In some other cases, the exterior switched reluctance machine 910 and the interior switched reluctance machine 920 operate as one output piece by locking the double rotors together. The exterior rotors 911 and the interior rotors 921 may be locked by either using mechanical lock devices or by utilizing the magnetic field and speed feedback control to synchronize the double rotors.

Reference is next made to FIG. 9B illustrating an insulation layer 930 that is inserted in the interior stator 922 to separate the flux paths between the exterior switched reluctance machine 910 and the interior switched reluctance machine 920. This allows the exterior and the interior switched reluctance machines 910 and 920, respectively, always operate independently and the two machines to have their own magnetic flux paths.

In the exterior switched reluctance machine 910, exterior coils 933 are wound on the exterior stator poles 936 of the exterior stator 912 and intermediate coils 913 are wound on the exterior poles 916 of the interior stator 922. An exterior air gap 934 is formed between the exterior poles 935 of the exterior rotor 911 and the exterior stator poles 936 of the exterior stator 912. An intermediate air gap 914 is formed between the interior poles 915 of the exterior rotor 911 and the exterior stator poles 916 of the interior stator 922.

The exciting exterior coils 933 generate the magnetic flux in the same direction as the intermediate coils 913 so that the magnetic flux generated by the exterior coils 933 penetrates the exterior air gap 934, crosses the exterior rotor back iron 918, and penetrates the intermediate air gap 914 to join with the magnetic flux generated by the intermediate coils 913 of the interior stator 922. The magnetic flux between the exciting stator poles and the corresponding rotor poles tends to align the exterior poles 935 and the interior poles 915 of the exterior rotor 911 with the exciting exterior stator poles 936 of the exterior stator 912 and the exterior stator poles 916 of the interior stator 922 so that the rotor rotates, thus providing the motoring operation. The exciting stator coils change phase from one pole to another in sequence according to the rotor position so that the motor keeps rotating.

In one example of magnetic flux path, the magnetic flux follow the exterior poles 916 of the interior stator 922 to the base of the exterior poles 916 and splits in half in the exterior back iron 917 of the interior stator 922 and merges again at the other end of the exterior pole base of the interior stator 922. The magnetic flux then again goes from the exterior pole 916 of the interior stator 922 through the intermediate air gap 914 into the interior poles 915 on the other side of the exterior rotor 911, then it crosses the back iron 918 of the exterior rotor 911 into the exterior poles 935 on the other side of the exterior rotor 911, and again crosses the exterior air gap 934 into the exterior stator poles 936. Eventually, the flux splits again in the exterior stator back iron 937 and merges at the base of the exterior stator pole 936 where the flux is generated.

The interior switched reluctance machine 920 contains an interior rotor 921, an interior stator 922, and interior coils 923. Both the interior rotor 921 and the interior stator 922 are salient, having interior rotor poles 925 and interior stator poles 926, respectively. The interior coils 923 are wound on the interior stator poles 926. An interior air gap 924 is formed between the interior rotor poles 925 and the interior stator poles 926.

The interior stator coil windings 923 generate magnetic flux through the interior stator poles 926. The flux penetrates the interior air gap 924 between the interior stator poles 926 and the interior rotor poles 925 and then goes into the interior rotor 921. The flux between the exciting stator poles and the corresponding rotor poles tends to align the interior rotor poles 925 with the exciting interior stator poles 926 so that the rotor rotates, thus providing the motoring operation. The exciting stator coils change phase from one pole to another in sequence according to the rotor position so that the motor keeps rotating. The flux then splits by half into the back iron 928 of the interior rotor 921 and merges again at the other end of the interior rotor pole 925 of the interior rotor 921. It then again goes through the interior rotor pole 925, the interior air gap 924, and the interior stator pole 926 on the other side of the interior rotor 921. Eventually, the flux splits in the interior stator back iron 927 and merges at the base of the interior stator pole 926 where the flux is generated.

In other embodiments, alternative magnetic flux path are created to synchronize the double rotors so that the switched reluctance machine 900 outputs as one single piece. In this case, the number of the exterior rotor poles 915 equals the number of the interior rotor poles 925. As a result, the corresponding exterior stator coils 936, the intermediate stator coils 916, and the interior stator coils 926 all have the same magnetic flux direction. The generated magnetic flux path goes from the exterior stator poles 936 through the exterior air gap 934 into the exterior poles 935 of the exterior rotor 911. It then passes through the back iron 918 and the interior poles 915 of the exterior rotor 911, crosses the intermediate air gap 914 into the exterior poles 916 of the interior stator 922. The magnetic flux then travels through the exterior back iron 917 and the interior back iron 927 and goes into the interior poles 926 of the interior stator 922. Next, the magnetic flux crosses the interior air gap 924 into the interior rotor poles 925 and splits in half in the back iron 928 of the interior rotor 922 to travel to the other side. Thereafter, the magnetic flux follows the same path on the other side according to the reverse order, and finally goes to the other side of the exterior stator poles 936. Eventually, the magnetic flux closes its path by splitting in half in the back iron 937 and meets at the exterior stator poles 936.

The flux paths described above for the various embodiments are for illustration purposes only. The switched reluctance machine 900 is illustrated to operate as motor. In some other cases, the exterior switched reluctance machine 910 and the interior switched reluctance machine 920 may both operate as generators. In some further cases, the exterior switched reluctance machine 910 and the interior switched reluctance machine 920 may operate as a motor and a generator.

As illustrated in the side view of the switched reluctance machine 900 in FIG. 9C, the double-rotor switched reluctance machine 900 provides two output paths. One output path is from the exterior rotor 911, and the other from the interior rotor 921. The exterior rotor 911 connects directly with the exterior shaft 919 and the interior rotor 921 connects directly with the interior shaft 929. Both the two rotors, thus the two output shafts 919 and 929, may be controlled independently by the exterior switched reluctance machine 910 and the interior switched reluctance machine 920, respectively.

As illustrated, the exterior output shaft 919 is placed toward one direction in while the interior output shaft 929 has terminal ends at both directions. However, in some other cases, the shafts may be placed towards the opposite directions or have different number of terminal ends.

Figure 10A:
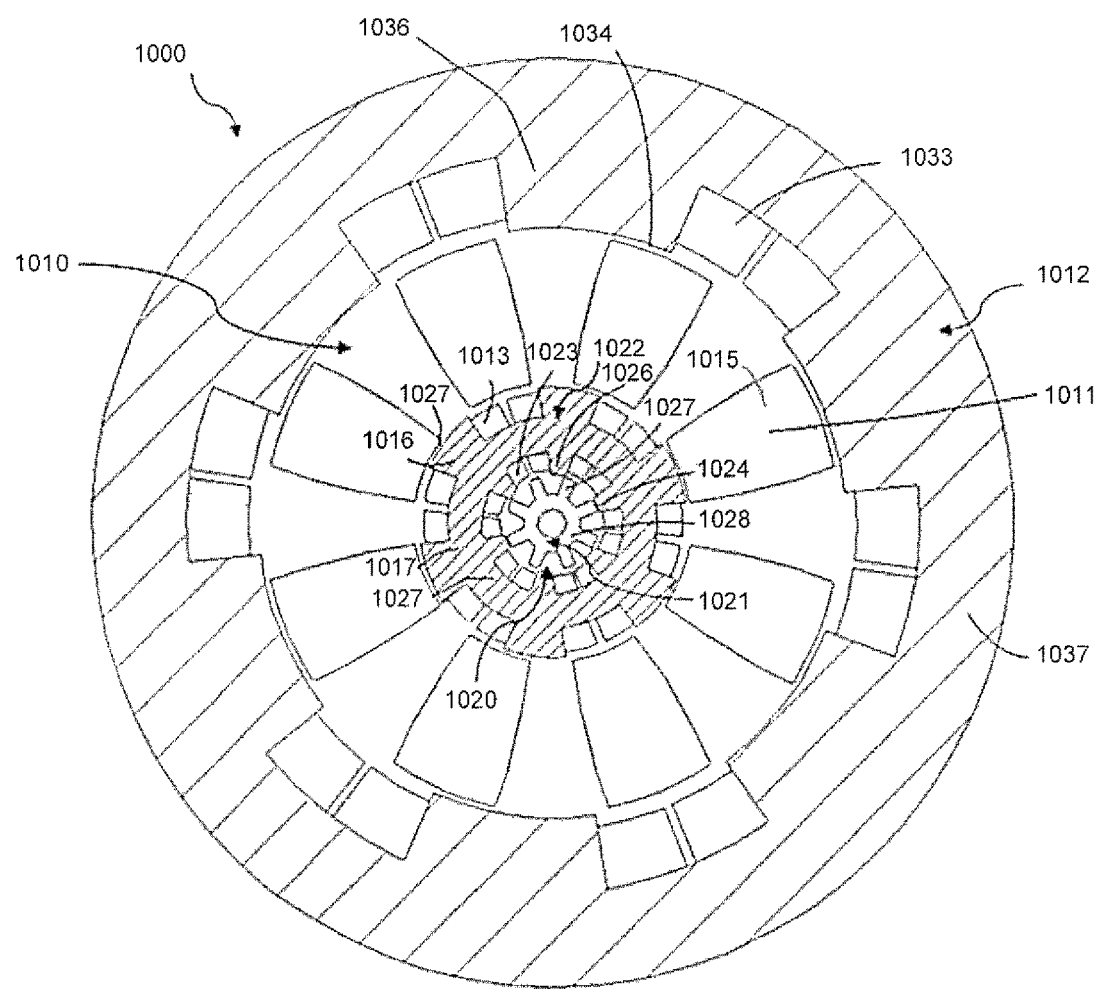
FIG. 10A is a cross-sectional view of a switched reluctance machine in accordance with an example embodiment.
Figure 10B:
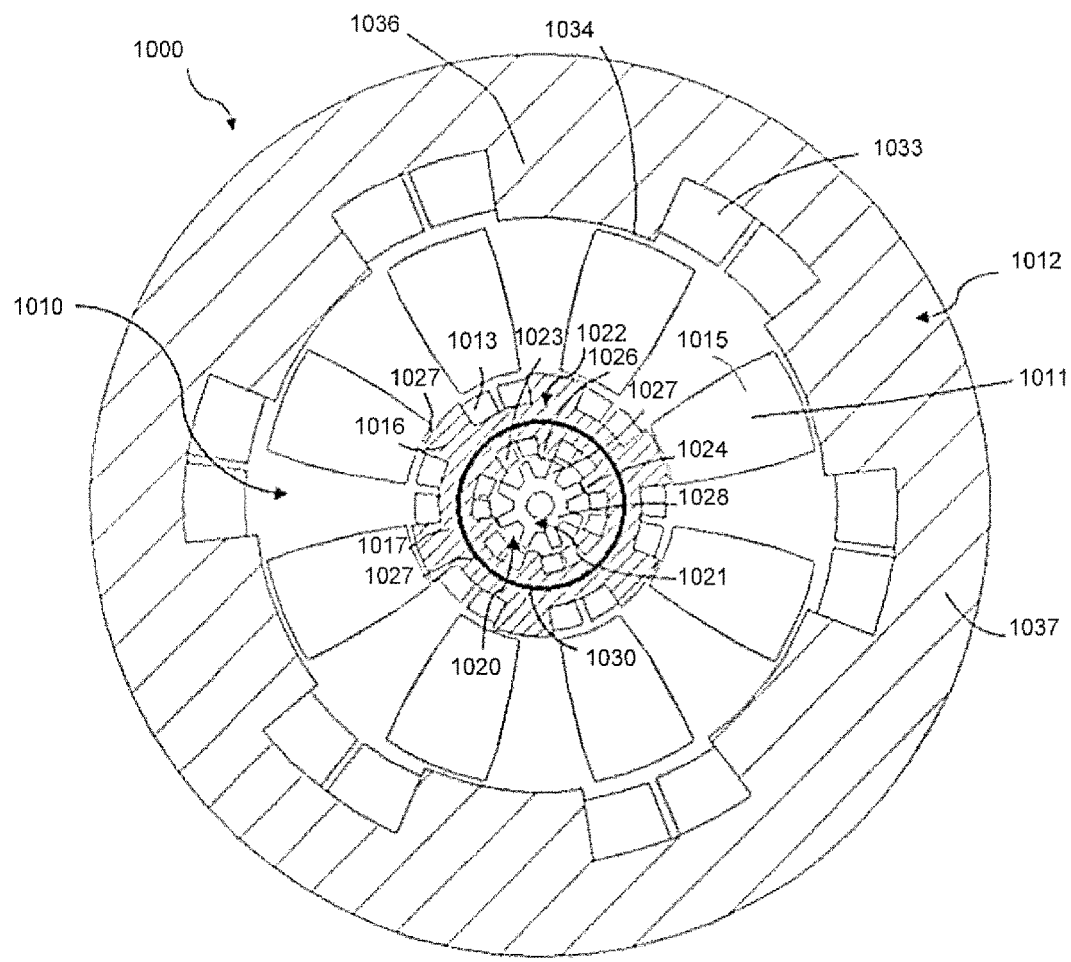
FIG. 10B is the switched reluctance machine of FIG. 10A with insulation in the interior stator.

Reference is next made to FIGS. 10A-10B, illustrating a switched reluctance machine 1000 according to another example embodiment. The switched reluctance machine 1000 consists of an exterior rotor 1011, an interior rotor 1021, an exterior stator 1012, and an interior stator 1022. Similar to the switched reluctance machine 900, the interior stator 1022 is placed in between the exterior rotor 1011 and the interior rotor 1021 concentrically while the exterior rotor 1011 is placed in between the exterior stator 1012 and the interior stator 1022 concentrically.

In contrast to the switched reluctance machine 900, the exterior rotor 1011 is made up of separated rotor columns 1015. This may have the advantage of reducing the weight of the exterior rotor and thus increases the power density of the double-rotor switched reluctance machine 1000.

The exterior stator 1012, the exterior rotor 1011, and the exterior portion of the interior stator 1022 form an exterior switched reluctance machine 1010. The exterior stator 1012 has the same number of the stator poles 1036 as the exterior poles 1016 of the interior stator 1022, and each of the exterior stator poles 1036 also aligns with the corresponding exterior poles 1016 of the interior stator 1022 radially. The interior side of the interior stator 1022 and the interior rotor 1021 form an interior switched reluctance machine 1020. The exterior switched reluctance machine 1010 and the interior switched reluctance machine 1020 can either operate independently or they can operate as one output piece by locking the double rotors together. This can be achieved by either using mechanical lock devices to lock the exterior rotor 1011 with the interior rotor 1021 or by utilizing the magnetic field and speed feedback control to synchronize the double rotors.

Reference is next made to FIG. 10B illustrating a switched reluctance machine 1000 having an insulation layer 1030 inserted in the interior stator 1022 to separate the flux paths between the exterior switched reluctance machine 1010 and the interior switched reluctance machine 1020. Accordingly, the two machines 1010 and 1020 always operate independently, and have their own magnetic flux paths.

In the exterior switched reluctance machine 1010, exterior coils 1033 are wound on the exterior stator poles 1036 of the exterior stator 1012 and intermediate coils 1013 are wound on the exterior poles 1016 of the interior stator 1022. An exterior air gap 1034 is formed between the exterior side of the exterior rotor column 1015 of the exterior rotor 1011 and the exterior stator poles 1036 of the exterior stator 1012. An intermediate air gap 1014 is formed between the interior side of the exterior rotor column 1015 of the exterior rotor 1011 and the exterior stator poles 1016 of the interior stator 1022.

The exciting exterior coils 1033 generate the magnetic flux as the same direction as the intermediate coils 1013 so that the magnetic flux generated by the exterior coils 1033 penetrates the exterior air gap 1034, cross the exterior rotor column 1015 and penetrates the intermediate air gap 1014 to join with the magnetic flux generated by the intermediate coils 1013 of the interior stator 1022. The magnetic flux between the exciting stator poles and the corresponding rotor poles tends to align the exterior rotor column 1015 of the exterior rotor 1011 with the exciting exterior stator poles 1036 of the exterior stator 1012 and the exterior stator poles 1016 of the interior stator 1022 so that the rotor rotates, thus providing the motoring operation.

The exciting stator coils change phase from one pole to another in sequence according to the rotor position so that the motor keeps rotating. The magnetic flux then follow the exterior poles 1016 of the interior stator 1022 to the base of the exterior poles 1016 and splits in half in the exterior back iron 1017 of the interior stator 1022 and merges again at the other end of the exterior pole base of the interior stator 1022. The magnetic flux then again goes from the exterior pole 1016 of the interior stator 1022 through the intermediate air gap 1014 into the exterior rotor column 1015 on the other side of the exterior rotor 1011, and again crosses the exterior air gap 1034 into the exterior stator poles 1036. Eventually, the flux splits again in the exterior stator back iron 1037 and merges at the base of the exterior stator pole 1036 where the flux is generated.

The interior switched reluctance machine 1020 contains an interior rotor 1021, an interior stator 1022, and interior coils 1023. Both the interior rotor 1021 and the interior stator 1022 are salient, having interior rotor poles 1025 and interior stator poles 1026, respectively. The interior coils 1023 are wound on the interior stator poles 1026. An interior air gap 1024 is formed between the interior rotor poles 1025 and the interior stator poles 1026. Fundamentally, the interior stator coil windings 1023 generate magnetic flux through the internal stator poles 1026.

The flux penetrates the interior air gap 1024 between the interior stator poles 1026 and the interior rotor poles 1025 and then goes into the interior rotor 1021. The flux between the exciting stator poles and the corresponding rotor poles tends to align the interior rotor poles 1025 with the exciting interior stator poles 1026 so that the rotor rotates, thus providing the motoring operation.

The exciting stator coils change phase from one pole to another in sequence according to the rotor position so that the motor keeps rotating. The flux then splits by half into the back iron 1028 of the interior rotor 1021 and merges again at the other end of the interior rotor pole 1025 of the interior rotor 1021. It then again goes through the interior rotor pole 1025, the interior air gap 1024, and the interior stator pole 1026 on the other side of the interior rotor 1021. Eventually, the flux splits in the interior stator back iron 1027 and merges at the base of the interior stator pole 1026 where the flux is generated.

The switched reluctance machine 1000 may operate as a motor, a generator, or a combination of both.

In some other embodiments, alternative magnetic flux path can also be created to synchronize the double rotors so that the double-rotor switched reluctance machine 1000 outputs as one single piece. In this case, the number of the exterior rotor columns 1015 equals the number of the interior rotor poles 1025; the corresponding exterior stator coils 1033, the intermediate stator coils 1013, and the interior stator coils 1023 all have the same magnetic flux direction.

The generated magnetic flux path goes from the exterior stator poles 1036 through the exterior air gap 1034 into the exterior rotor column 1015 of the exterior rotor 1011. It then crosses the intermediate air gap 1014 into the exterior poles 1016 of the interior stator 1022. The magnetic flux then travels through the exterior back iron 1017 and the interior back iron 1027 and goes into the interior poles 1026 of the interior stator 1022. Next, the magnetic flux crosses the interior air gap 1024 into the interior rotor poles 1025 and splits in half in the back iron 1028 of the interior rotor 1022 to travel to the other side. Thereafter, the magnetic flux follows the same path on the other side according to the reverse order, and finally goes to the other side of the exterior stator poles 1036. Eventually, the magnetic flux closes its path by splitting in half in the back iron 1037 and meets at the exterior stator poles 1036 where the flux is generated.

Figure 11:
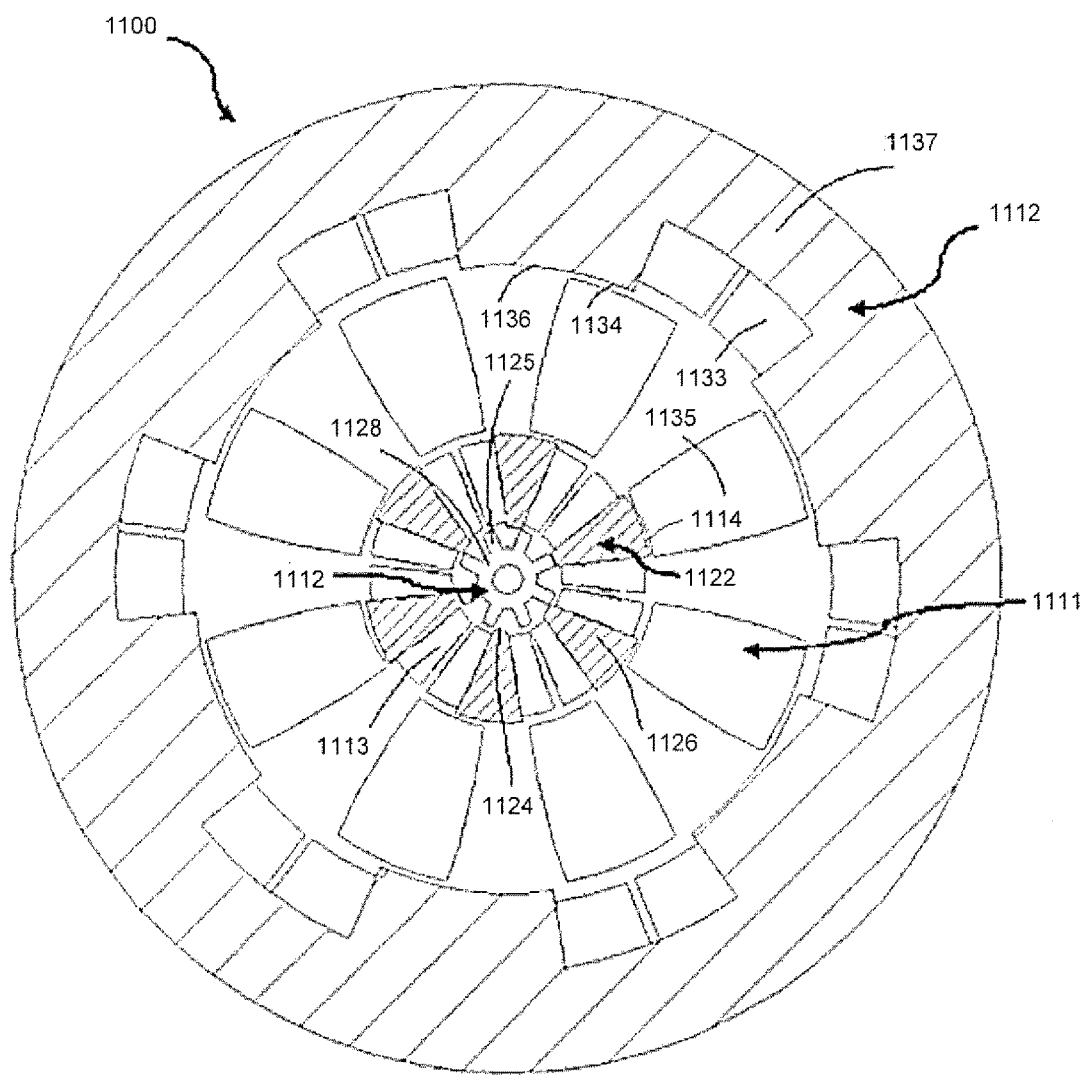
FIG. 11 is a cross-sectional side view of a switched reluctance machine in accordance with an example embodiment.

Reference is next made to FIG. 11, illustrating a switched reluctance machine 1100 according to an example embodiment. The switched reluctance machine 1100 consists of an exterior rotor 1111, an interior rotor 1121, an exterior stator 1112, and an interior stator 1122. Similar to the switched reluctance machine 900 of FIG. 9 and switched reluctance machine 1000 of FIG. 10, the interior stator 1122 is placed in between the exterior rotor 1111 and the interior rotor 1121 concentrically while the exterior rotor 1111 is placed in between the exterior stator 1112 and the interior stator 1122 concentrically.

As illustrated in FIG. 11, the exterior rotor 1111 is made up of separated rotor columns 1135. As well, the interior stator 1122 is made up of separated stator columns 1126 with just one set of interior stator coils 1113 wound on it. This may have the advantage of reducing the weight and thus increasing the power density. The construction complexity may be reduced as well.

In this embodiment, the exterior stator 1112 has the same number of the stator poles 1136 as the interior stator columns 1126 of the interior stator 1122, and each of the exterior stator poles 1136 also aligns with the corresponding interior stator columns 1126 of the interior stator 1122 radially. In addition, the interior rotor 1121 has the same number of the rotor poles 1125 as the exterior rotor columns 1135 of the exterior stator 1111, and each of the interior rotor poles 1125 also aligns with the corresponding exterior rotor columns 1135 of the exterior rotor 1111 radially.

In the switched reluctance machine 1100, the exterior rotor 1111 and the interior rotor 1121 operate as one single output piece by locking the double rotors together in the eleventh embodiment. This may be achieved by either using mechanical lock devices to lock the exterior rotor 1111 with the interior rotor 1121 or by utilizing the magnetic field and speed feedback control to synchronize the double rotors.

In this embodiment, the corresponding exterior stator coils 1133 and the interior rotor coils 1113 have the same magnetic flux direction. In one example, the generated magnetic flux path goes from the exterior stator poles 1136 through the exterior air gap 1134 into the exterior rotor columns 1135 of the exterior rotor 1111. It then crosses the intermediate air gap 1114 into the interior stator columns 1126 of the interior stator 1122. Next, the magnetic flux crosses the interior air gap 1124 into the interior rotor poles 1125 and splits in half in the back iron 1128 of the interior rotor 1122 to travel to the other side. Thereafter, the magnetic flux follows the same path on the other side according to the reverse order, and finally goes to the other side of the exterior stator poles 1136. Eventually, the magnetic flux closes its path by splitting in half in the back iron 1137 and meets at the exterior stator poles 1136 where the flux is generated. In other examples, other flux paths are generated.

Figure 12A:
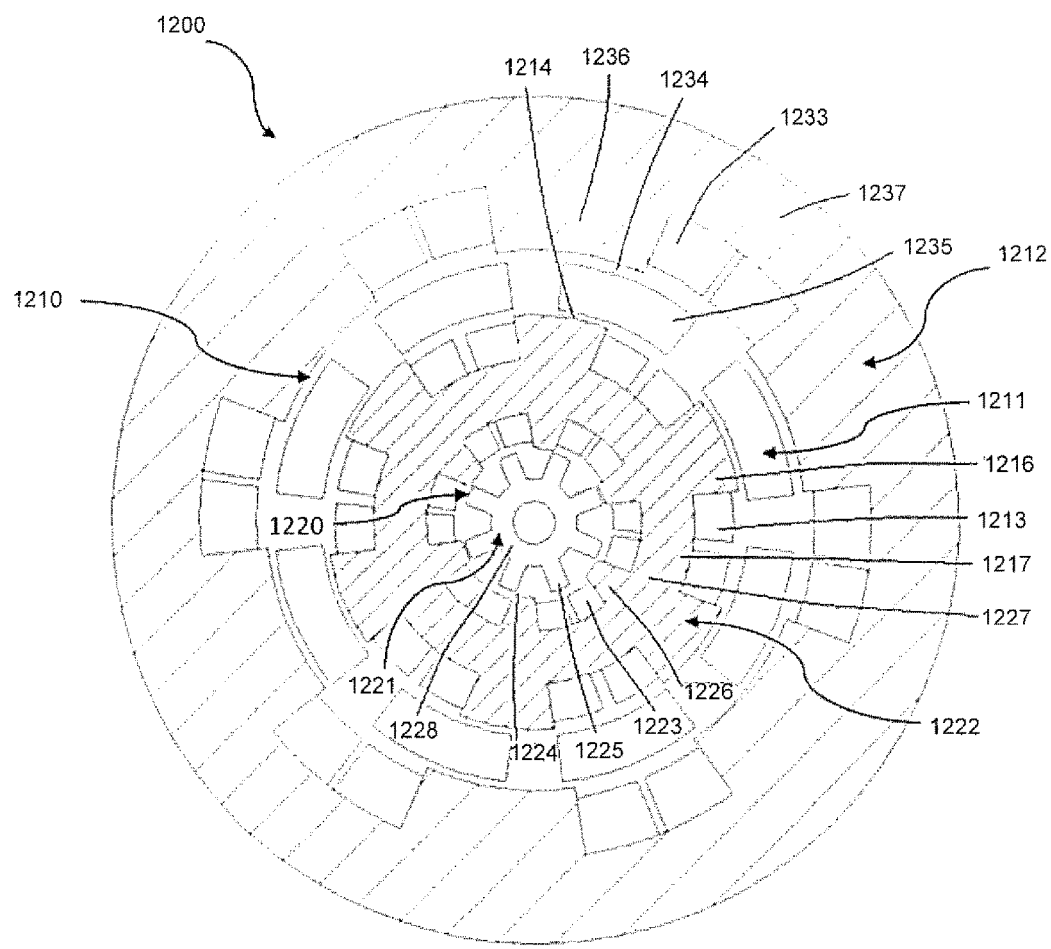
FIG. 12A is a cross-sectional view of a switched reluctance machine in accordance with an example embodiment.
Figure 12B:
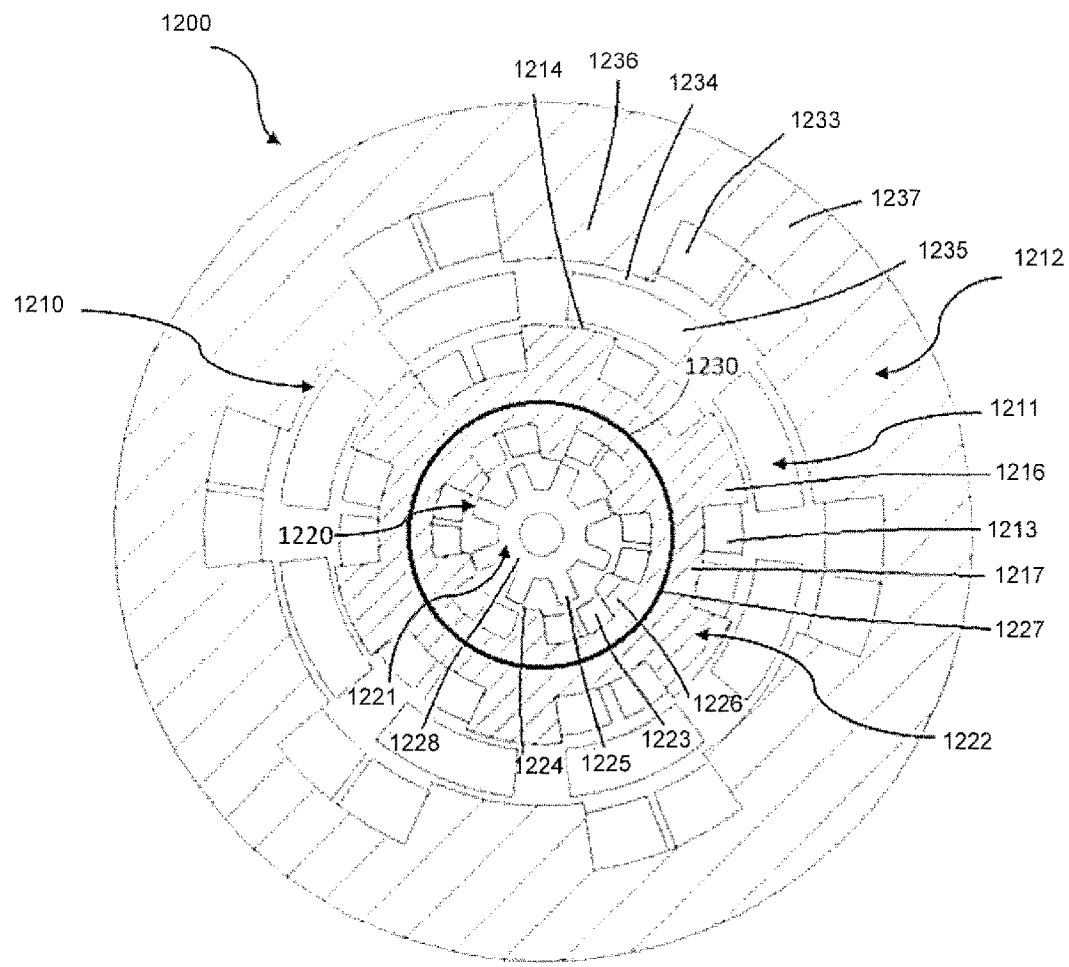
FIG. 12B is the switched reluctance machine of FIG. 12A with insulation in the interior stator.

Reference is next made of FIGS. 12A-12B, illustrating a switched reluctance machine 1200 according to another example embodiment. The switched reluctance machine 1200 is analogous to the designs of switched reluctance machines 900 of FIG. 9, 1000 of FIG. 10 and 1100 of FIG. 11. Switched reluctance machine 1200 consists of an exterior rotor 1211, an interior rotor 1221, an exterior stator 1212, and an interior stator 1222.

Switched reluctance machine 1200 contains an exterior rotor 1211 made up of separated rotor shells 1235. The shell shape of rotors enables magnetic flux to transmit circumferentially inside the exterior rotor 1211.

The exterior stator 1212, the exterior rotor 1211, and the exterior side of the interior stator 1222 form an exterior switched reluctance machine 1210. The exterior stator 1212 has the same number of the stator poles 1236 as the exterior poles 1216 of the interior stator 1222, and each of the exterior stator poles 1236 also aligns with the corresponding exterior poles 1216 of the interior stator 1222 radially.

The interior side of the interior stator 1222 and the interior rotor 1221 form an interior switched reluctance machine 1220. The exterior switched reluctance machine 1210 and the interior switched reluctance machine 1220 can operate independently.

Reference is next made to FIG. 12B illustrating the switched reluctance machine 1200 having an insulation layer 1230. The insulation layer 1230 is inserted in the interior stator 1222 to separate the flux paths between the exterior switched reluctance machine 1210 and the interior switched reluctance machine 1220.

In the exterior switched reluctance machine 1210, exterior coils 1233 are wound on the exterior stator poles 1236 of the exterior stator 1212 and intermediate coils 1213 are wound on the exterior poles 1216 of the interior stator 1222. An exterior air gap 1234 is formed between the exterior pole shells 1235 of the exterior rotor 1211 and the exterior stator poles 1236 of the exterior stator 1212. An intermediate air gap 1214 is formed between the exterior pole shells 1235 of the exterior rotor 1211 and the exterior stator poles 1216 of the interior stator 1222.

The exciting exterior coils 1233 generate the opposite direction magnetic flux from the corresponding intermediate coils 1213. The exterior magnetic flux generated by the exterior coils 1233 crosses the exterior air gap 1234 into the exterior rotor shell 1235. The intermediate magnetic flux generated by the intermediate coils 1213 crosses the intermediate air gap 1214 also into the exterior rotor shell 1235. The flux between the exciting stator poles and the corresponding rotor poles tends to align the exterior rotor shell 1235 with the exciting exterior stator poles 1236 and the exciting intermediate stator poles 1216 so that the rotor rotates, thus providing the motoring operation.

The exciting stator coils change phase from one pole to another in sequence according to the rotor position so that the motor keeps rotating. Since the two magnetic flux directions are opposed to each other, instead of travelling radially, they merge inside the exterior rotor shell 1235 and travels along the circumferential direction. The magnetic flux then splits into exterior magnetic flux and intermediate flux again at the other end of the exterior rotor shell 1235. The exterior magnetic flux crosses the exterior air gap 1234 into the adjacent exterior stator pole 1236 and then goes through the exterior stator back iron 1237 to the original exterior stator pole where the exterior magnetic flux is generated. The intermediate magnetic flux crosses the intermediate air gap 1214 into the corresponding adjacent exterior pole 1216 of the interior stator 1222 and then goes through the outer part of the interior stator back iron 1217 to the original exterior pole 1216 of the interior stator 1222 where the intermediate magnetic flux is generated.

The interior switched reluctance machine 1220 contains an interior rotor 1221, an interior stator 1222, and interior coils 1223. Both the interior rotor 1221 and the interior stator 1222 are salient, having interior rotor poles 1225 and interior stator poles 1226, respectively. The interior coils 1223 are wound on the interior stator poles 1226. An interior air gap 1224 is formed between the interior rotor poles 1225 and the interior stator poles 1226.

The interior stator coil windings 1223 generate magnetic flux through the internal stator poles 1226. The flux penetrates the interior air gap 1224 between the interior stator poles 1226 and the interior rotor poles 1225 and then goes into the interior rotor 1221. The flux between the exciting stator poles and the corresponding rotor poles tends to align the interior rotor poles 1225 with the exciting interior stator poles 1226 so that the rotor rotates, thus providing the motoring operation.

The exciting stator coils change phase from one pole to another in sequence according to the rotor position so that the motor keeps rotating. The flux then splits by half into the back iron 1228 of the interior rotor 1221 and merges again at the other end of the interior rotor pole 1225 of the interior rotor 1221. It then again goes through the interior rotor pole 1225, the interior air gap 1224, and the interior stator pole 1226 on the other side of the interior rotor 1221. Eventually, the flux splits in the interior stator back iron 1227 and merges at the base of the interior stator pole 1226 where the flux is generated.

Figure 13A:
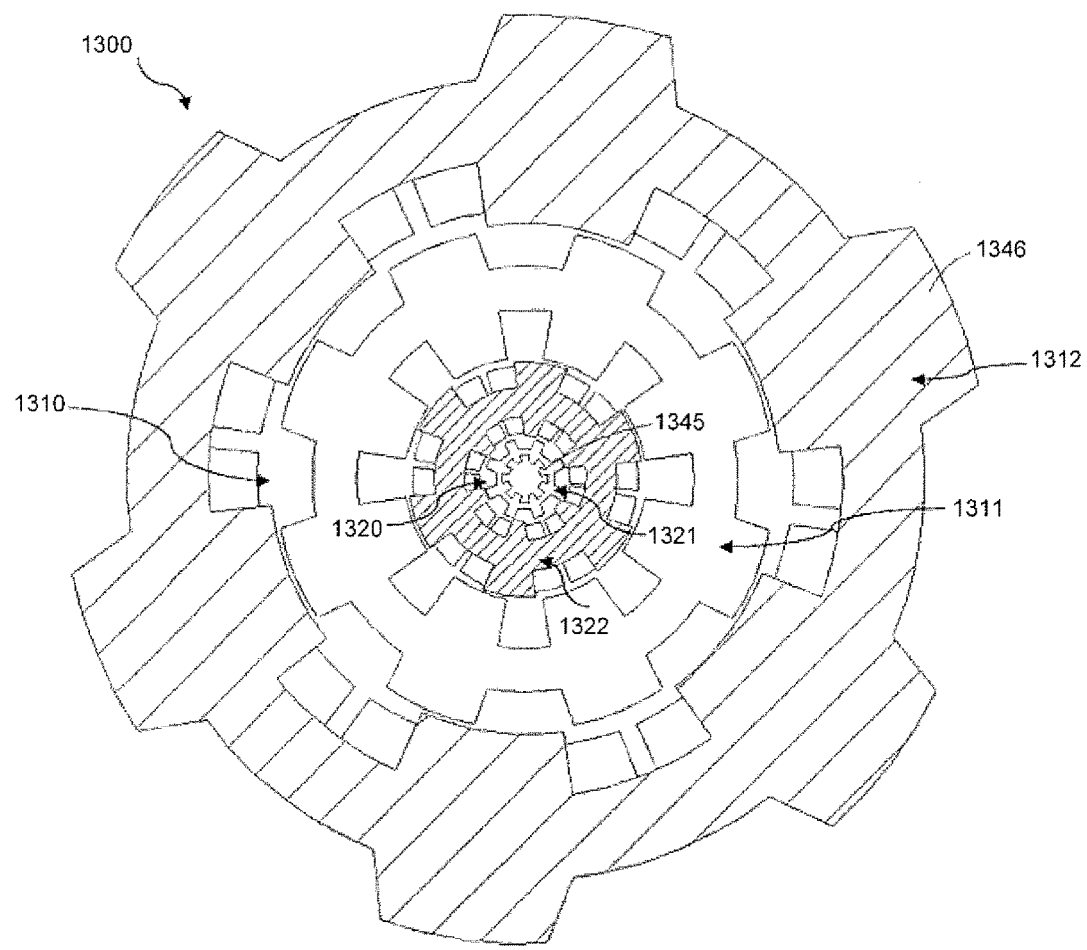
FIG. 13A is a cross-sectional view of a switched reluctance machine in accordance with an example embodiment.
Figure 13B:
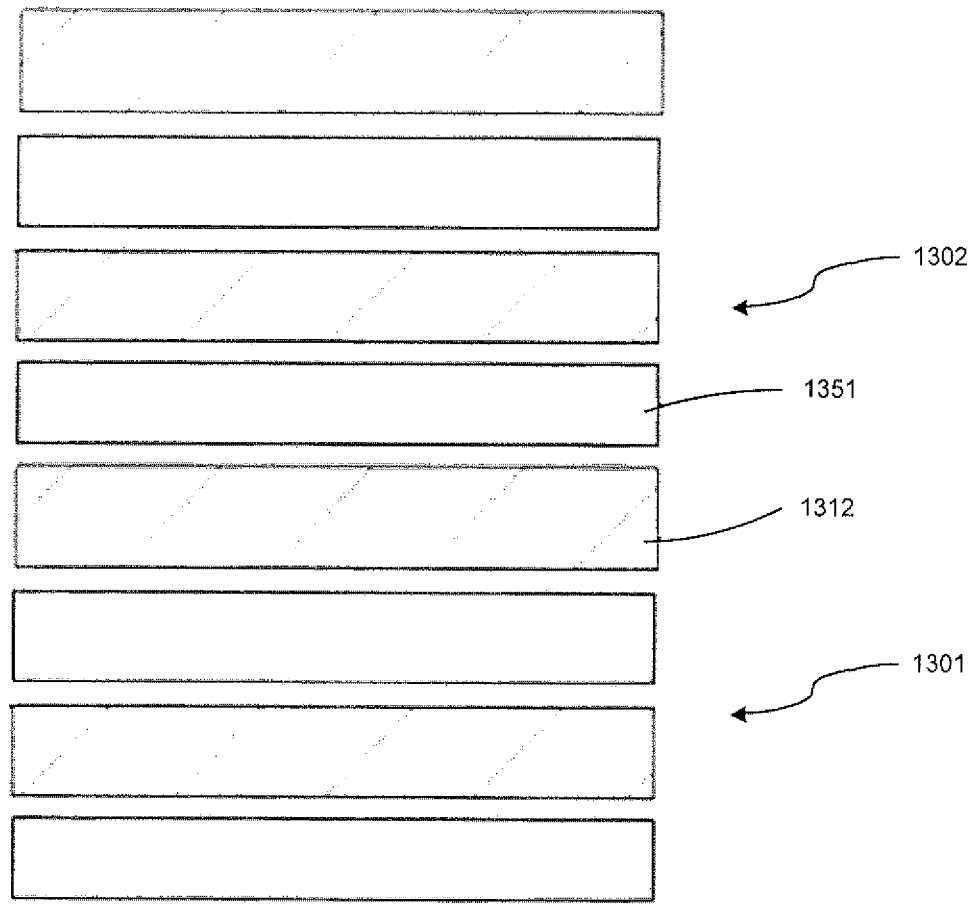
FIG. 13B is another view of the switched reluctance machine of FIG. 13A.
Figure 13C:
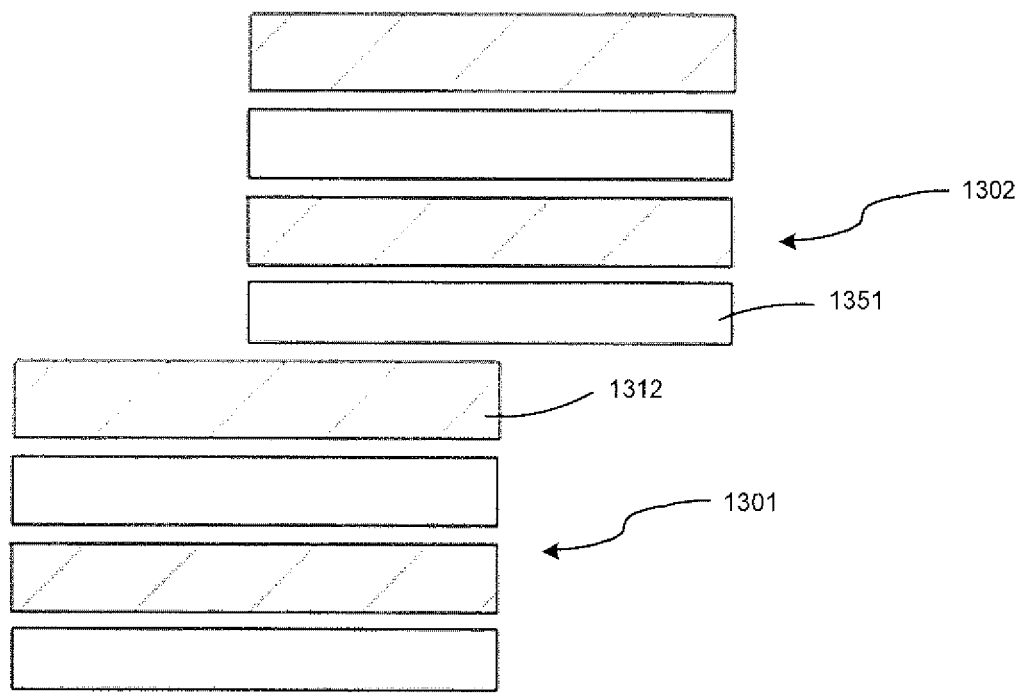
FIG. 13C is a further view of the switched reluctance machine of FIG. 13A.

Reference is next made to FIGS. 13A-13C, illustrating a switched reluctance machine 1300 according to an example embodiment. The switched reluctance machine 1300 may be analogous to the designs of any of the switched reluctance machines 900 of FIG. 9, 1000 of FIG. 10, 1100 of FIG. 11 or 1200 of FIG. 12, with an exception in the number of poles in the exterior stator, interior rotor or a combination of both.

Switched reluctance machine 1300 consists of an exterior rotor 1311, an interior rotor 1321, an exterior stator 1312, and an interior stator 1322. The exterior stator 1312 of the switched reluctance machine 1300 is double salient with additional exterior stator poles 1346. The additional poles are provided on the exterior side of the exterior stator 1312.

The interior rotor 1321 is also double salient with additional interior rotor poles 1345. The additional poles are provided on the interior side of the interior rotor 1321.

The double salient feature of this embodiment enables the capability of the assembly of multiple switched reluctance machine modules into one machine set.

FIG. 13B illustrates two switched reluctance machines 1301 and 1302 integrated concentrically, forming an additional switched reluctance machine between the exterior stator 1312 of the first switched reluctance machines 1301 and the interior rotor 1351 of the second switched reluctance machine 1302.

The multiple switched reluctance machines feature allows for more machine integration within one housing so that more output may be realized to meet different application requirement. In various cases, multiple rotors are utilized as one output piece to sum all the torque from individual switched reluctance machines. This may have the advantage of higher output torque density and power density.

FIG. 13C illustrates the switched reluctance machine 1300 where the multiple switched reluctance machines are displaced at different locations along the axial direction. Displacing individual switched reluctance machines at different axial positions may bring in more flexibility in powertrain assembly, especially for those situations where assembly space is limited and predetermined by other components in the powertrain.

The above-described embodiments and applications of the present invention are intended only to be examples. Alterations, modifications and variations may be effected to the particular embodiments by those of ordinary skill in the art, in light of this teaching, without departing from the spirit of or exceeding the scope of the claimed invention.

The invention claimed is:

1. A switched reluctance machine comprising:
   an interior rotor;
   an exterior rotor spaced from the interior rotor, the interior rotor and the exterior rotor being coaxially and concentrically disposed;
   at least one stator disposed concentrically with the interior rotor and the exterior rotor, wherein the at least one stator comprises a plurality of salient exterior stator poles extending towards the exterior rotor and a plurality of salient interior stator poles extending towards the interior rotor, the interior rotor, the exterior rotor and the at least one stator being configured to provide an interior switched reluctance machine and an exterior switched reluctance machine;
   a plurality of exterior coil windings wound around the plurality of exterior stator poles, wherein the plurality of exterior coil windings define a plurality of exterior machine phases, and the exterior coil windings corresponding to each exterior machine phase are excitable in sequence according to the position of the exterior rotor to define a first magnetic flux path of the exterior switched reluctance machine; and
   a plurality of interior coil windings wound around the plurality of interior stator poles, wherein the plurality of interior coil windings define a plurality of interior machine phases, and the interior coil windings corresponding to each interior machine phase are excitable in sequence according to the position of the interior rotor to define a second magnetic flux path of the interior switched reluctance machine;
   wherein the interior switched reluctance machine and the exterior switched reluctance machine are at least partially integrated enabling the first magnetic flux path of the exterior switched reluctance machine and the second magnetic flux path of the interior switched reluctance machine to merge, and the interior switched reluctance machine and the exterior switched reluctance machine are independently operable, wherein during operation of the switched reluctance the first magnetic flux path and the second magnetic flux path merge dynamically such that, relative to the positions of the interior rotor and the exterior rotor, the flux pattern defined by the first magnetic flux path and the second magnetic flux path varies as the interior rotor and the exterior rotor change position independently.

2. The switched reluctance machine of claim 1, wherein the at least one stator is located between the exterior rotor and the interior rotor, the at least one stator having an exterior side and an interior side, the exterior side being salient with the exterior stator poles and the interior side being salient with the interior stator poles, wherein the exterior switched reluctance machine comprises the exterior rotor and the exterior side of the stator, and the interior switched reluctance machine comprises the interior side of the stator and the interior rotor.

3. The switched reluctance machine of claim 1, wherein the at least one stator is located outside the exterior rotor, wherein the exterior rotor comprises an exterior side and an interior side, the exterior side being salient with the exterior poles and the interior side being salient with the interior poles, and wherein the exterior switched reluctance machine comprises the at least one stator and the exterior side of the exterior rotor, and the interior switched reluctance machine comprises the interior side of the exterior rotor and the interior rotor.

4. The switched reluctance machine of claim 1, wherein the at least one stator is located inside the interior rotor, wherein the interior rotor comprises an exterior side and an interior side, the exterior side being salient with the exterior poles and the interior side being salient with the interior poles, and wherein the exterior switched reluctance machine comprises the exterior rotor and the exterior side of the interior rotor, and the interior switched reluctance machine comprises the interior side of the interior rotor and the at least one stator.

5. The switched reluctance machine of claim 1, wherein the at least one stator comprises an exterior stator and an interior stator, the exterior stator being spaced from the interior stator, the exterior stator and the interior stator being concentrically disposed with the interior rotor and the exterior rotor.

6. The switched reluctance machine of claim 5, wherein the interior stator is located between the exterior rotor and the interior rotor, and the exterior stator is located outside the exterior rotor, wherein the inner stator comprises an exterior side and an interior side, the exterior side being salient with the exterior poles and the interior side being salient with the interior poles, and wherein the exterior switched reluctance machine comprises the exterior stator, the exterior rotor and the exterior side of the interior stator, and the interior switched reluctance machine comprises the interior side of the interior stator and the interior rotor.

7. The switched reluctance machine of claim 2, wherein the exterior rotor and the interior rotor are configured to rotate simultaneously.

8. The switched reluctance machine of claim 1, wherein the exterior rotor comprises a plurality of rotor shells, the rotor shells being separated from each other and the rotor shells being mechanically coupled to each other.

9. A method of manufacturing a switched reluctance machine, the method comprising:
 providing an interior rotor;
 disposing an exterior rotor spaced from the interior rotor, the exterior rotor being coaxially and concentrically disposed;
 disposing at least one stator concentrically with the interior rotor and the exterior rotor, wherein the at least one stator comprises a plurality of salient exterior stator poles extending towards the exterior rotor and a plurality of salient interior stator poles extending towards the interior rotor, the interior rotor, the exterior rotor and the at least one stator being configured to provide an interior switched reluctance machine and an exterior switched reluctance machine;
 winding a plurality of exterior coil windings around the plurality of exterior stator poles, wherein the plurality of exterior coil windings define a plurality of exterior machine phases, and the exterior coil windings corresponding to each exterior machine phase are excitable in sequence according to the position of the exterior rotor to define a first magnetic flux path of the exterior switched reluctance machine; and
 winding a plurality of interior coil windings around the plurality of interior stator poles, wherein the plurality of interior coil windings define a plurality of interior machine phases, and the interior coil windings corresponding to each interior machine phase are excitable in sequence according to the position of the interior rotor to define a second magnetic flux path of the interior switched reluctance machine;
 wherein the interior switched reluctance machine and the exterior switched reluctance machine are at least partially integrated enabling the first magnetic flux path of the exterior switched reluctance machine and the second magnetic flux path of the interior switched reluctance machine to merge, and the interior switched reluctance machine and the exterior switched reluctance machine are independently operable, wherein during operation of the switched reluctance the first magnetic flux path and the second magnetic flux path merge dynamically such that, relative to the positions of the interior rotor and the exterior rotor, the flux pattern defined by the first magnetic flux path and the second magnetic flux path varies as the interior rotor and the exterior rotor change position independently.

10. The method of claim 9, further comprising:
 disposing the at least one stator between the exterior rotor and the interior rotor, the at least one stator having an exterior side and an interior side; and
 providing exterior stator poles to the exterior side of the at least one stator and interior stator poles to the interior side of the at least one stator,
 wherein the exterior switched reluctance machine comprises the exterior rotor and the exterior side of the stator, and the interior switched reluctance machine comprises the interior side of the stator and the interior rotor.

11. The method of claim 9, further comprising:
 disposing the at least one stator outside the exterior rotor; and
 configuring the exterior rotor to have exterior poles on an exterior side of the exterior rotor and interior poles on an interior side of the exterior rotor;
 wherein the exterior switched reluctance machine comprises the at least one stator and the exterior side of the exterior rotor, and the interior switched reluctance machine comprises the interior side of the exterior rotor and the interior rotor.

12. The method of claim 9, further comprising:
 disposing the at least one stator inside the interior rotor; and
 configuring the interior rotor to have exterior poles on an exterior side of the interior rotor and interior poles on an interior side of the interior rotor,
 wherein the exterior switched reluctance machine comprises the exterior rotor and the exterior side of the interior rotor, and the interior switched reluctance machine comprises the interior side of the interior rotor and the at least one stator.

13. The method of claim 9, wherein the at least one stator comprises an exterior stator and an interior stator, the method further comprising disposing the exterior stator spaced from the interior stator, wherein the exterior stator and the interior stator are disposed concentrically with the interior rotor and the exterior rotor.

14. The method of claim 13, further comprising:
 disposing the interior stator between the exterior rotor and the interior rotor, and the exterior stator outside the exterior rotor; and
 configuring the inner stator to have exterior poles on an exterior side of the inner stator and interior poles on an interior side of the inner stator;
 wherein the exterior switched reluctance machine comprises the exterior stator, the exterior rotor and the exterior side of the interior stator, and the interior switched reluctance machine comprises the interior side of the interior stator and the interior rotor.

15. The method of claim 9, further comprising rotating the exterior rotor and the interior rotor simultaneously.

16. The method of claim 9, wherein the exterior rotor comprises a plurality of rotor shells, the rotor shells being separated from each other and the rotor shells being mechanically coupled to each other.

17. The switched reluctance machine of claim 1, wherein the exterior switched reluctance machine is coupled to an exterior output shaft and the interior switched reluctance machine is coupled to an interior output shaft separate from the exterior output shaft.

18. A switched reluctance machine comprising:
 an interior rotor;
 an exterior rotor spaced from the interior rotor, the interior rotor and the exterior rotor being coaxially and concentrically disposed;
 a stator disposed concentrically with the interior rotor and the exterior rotor, wherein the at least one stator comprises a plurality of salient exterior stator poles extending towards the exterior rotor and a plurality of salient interior stator poles extending towards the interior rotor, the interior rotor, the exterior rotor and the stator being configured to provide an interior switched reluctance machine and an exterior switched reluctance machine;

a plurality of exterior coil windings wound around the plurality of exterior stator poles, wherein the plurality of exterior coil windings define a plurality of exterior machine phases, and the exterior coil windings corresponding to each exterior machine phase are excitable in sequence according to the position of the exterior rotor to define a first magnetic flux path of the exterior switched reluctance machine; and a plurality of interior coil windings wound around the plurality of interior stator poles, wherein the plurality of interior coil windings define a plurality of interior machine phases, and the interior coil windings corresponding to each interior machine phase are excitable in sequence according to the position of the interior rotor to define a second magnetic flux path of the interior switched reluctance machine;

wherein the stator is located between the exterior rotor and the interior rotor, the stator having an exterior side and an interior side, the exterior side being salient with exterior stator poles and the interior side being salient with interior stator poles, wherein the exterior switched reluctance machine comprises the exterior rotor and the exterior side of the stator, and the interior switched reluctance machine comprises the interior side of the stator and the interior rotor, and the stator has a continuous stator core that is uninterrupted between the interior side and the exterior side;

wherein during operation of the switched reluctance the first magnetic flux path and the second magnetic flux path merge dynamically such that, relative to the positions of the interior rotor and the exterior rotor, the flux pattern defined by the first magnetic flux path and the second magnetic flux path varies as the interior rotor and the exterior rotor change position independently.

* * * * *